United States Patent
Tokio et al.

[11] Patent Number: 6,032,549
[45] Date of Patent: Mar. 7, 2000

[54] ACTUATOR, METHOD OF DRIVING ACTUATOR, COMPUTER-READABLE MEDIUM FOR STORING PROGRAM PROCESSED BY COMPUTER FOR EXECUTING DRIVING METHOD, AND COMPACT MACHINE TOOL UTILIZING ACTUATOR

[75] Inventors: Kitahara Tokio; Yuichi Ishikawa, both of Tsukuba; Kazuyoshi Furuta, Chiba, all of Japan

[73] Assignees: Agency of Industrial Science and Technology; Seiko Instruments Inc., both of Japan

[21] Appl. No.: 08/906,387

[22] Filed: Aug. 5, 1997

[30] Foreign Application Priority Data

Oct. 8, 1996 [JP] Japan .................................. 8 267543
Jun. 18, 1997 [JP] Japan .................................. 9 161717

[51] Int. Cl.⁷ .............................. F16H 27/02; H01L 41/04
[52] U.S. Cl. .............................. 74/128; 310/323; 310/328
[58] Field of Search .............................. 74/110, 128, 129, 74/490.09; 310/328, 310, 323; 318/116

[56] References Cited

U.S. PATENT DOCUMENTS

| | | | |
|---|---|---|---|
| 4,736,131 | 4/1988 | Fujimoto | 310/328 |
| 4,777,398 | 10/1988 | Shibuya | 310/328 |
| 5,319,257 | 6/1994 | McIntyre | 310/328 |
| 5,508,838 | 4/1996 | Shimizu et al. | 310/328 X |
| 5,554,905 | 9/1996 | Gschwind et al. | 310/328 X |
| 5,558,557 | 9/1996 | Dashevsky | 451/26 |
| 5,686,778 | 11/1997 | Fukuda | 310/328 |
| 5,698,929 | 12/1997 | Seki et al. | 318/328 |
| 5,739,724 | 4/1998 | Alexandre et al. | 310/116 |
| 5,783,899 | 7/1998 | Okazaki | 310/323 |

FOREIGN PATENT DOCUMENTS

592030A1  4/1994  European Pat. Off. .

Primary Examiner—Tamara L. Graysay
Assistant Examiner—Marcus Charles
Attorney, Agent, or Firm—Adams & Vilks

[57] ABSTRACT

An actuator comprises a base, a guide assembly mounted on the base, a first displacing unit mounted on the base for displacement into engagement with the guide assembly to place the first displacing unit in a fixed state and for displacement in a moving direction along the guide assembly when the first displacing unit is not in a fixed state, and a second displacing unit integrally connected to the first displacing unit and mounted on the base for displacement in the moving direction along the guide assembly. A holder is mounted in contact with the guide assembly for movement with the second displacing unit and for supporting the second displacing unit on the guide assembly with a frictional force weaker than a force with which the first displacing unit is maintained in the fixed state to thereby allow the second displacing unit and the holder to move in the moving direction while the holder contacts the guide assembly and while the first displacing unit is in the fixed state.

30 Claims, 18 Drawing Sheets

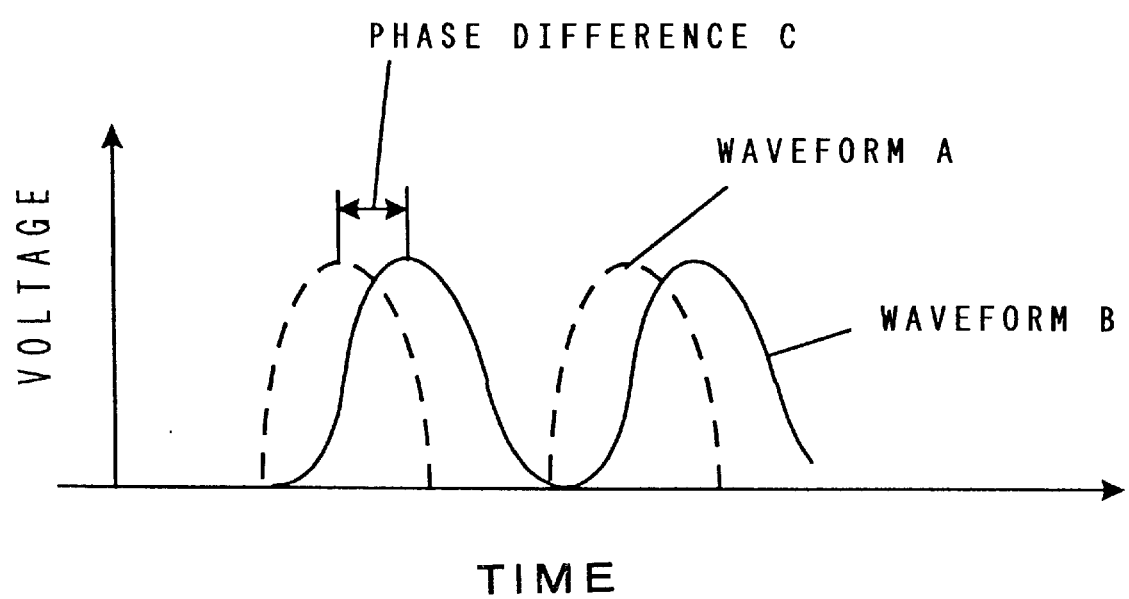
F I G. 5

FIG. 11A
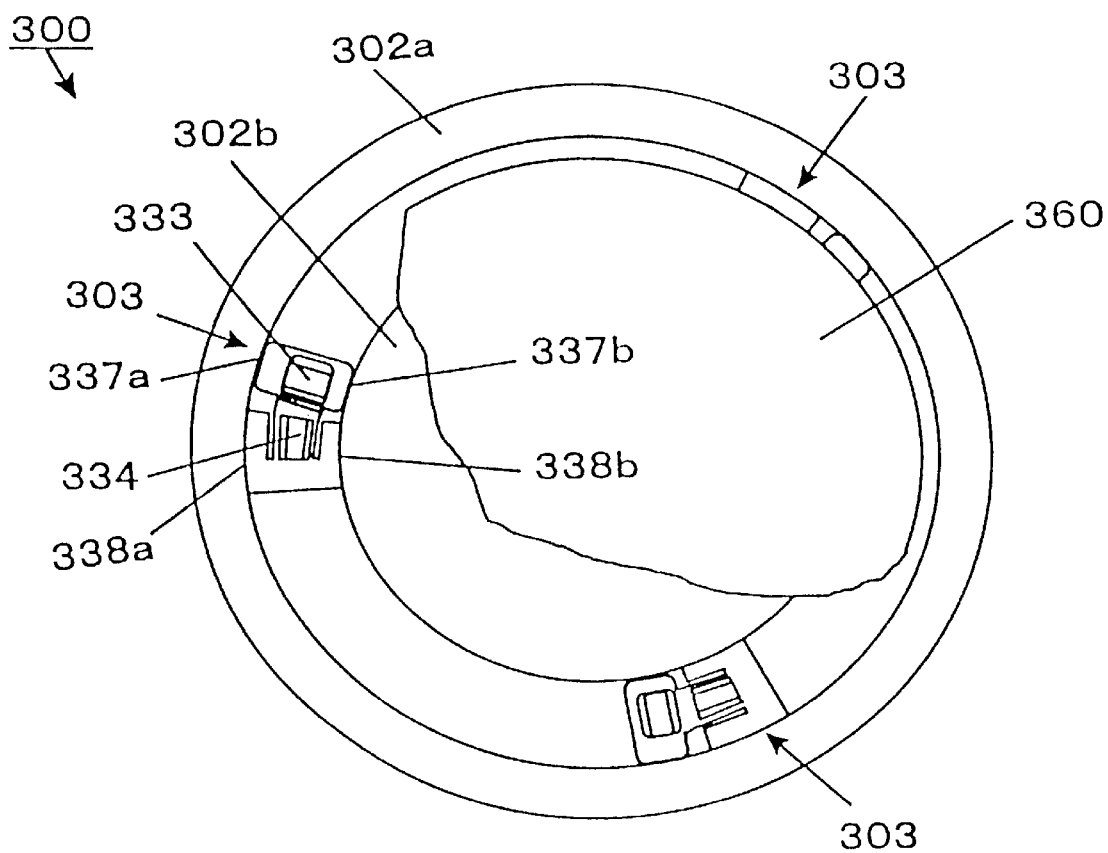
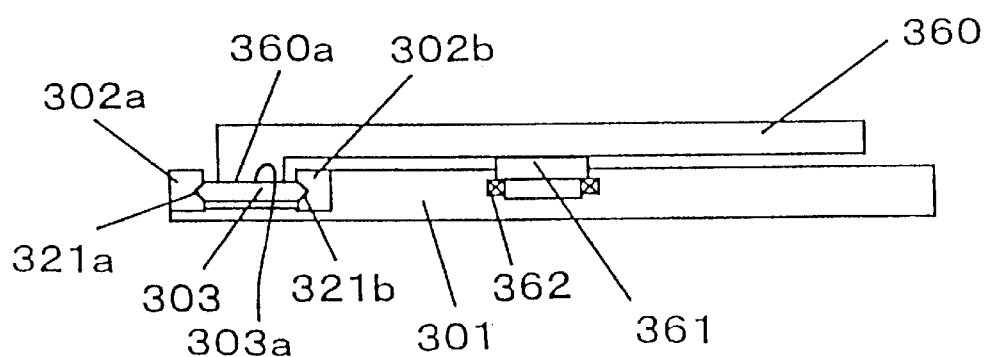
FIG. 11B

F I G. 1 4 A
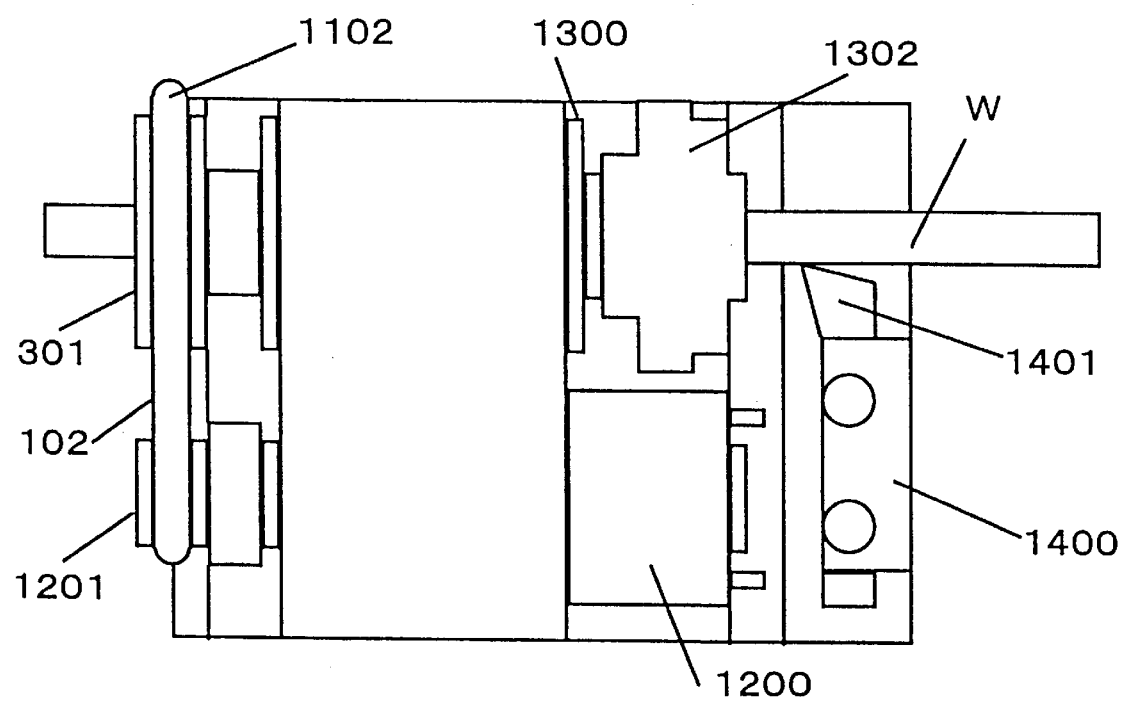
F I G. 1 4 B
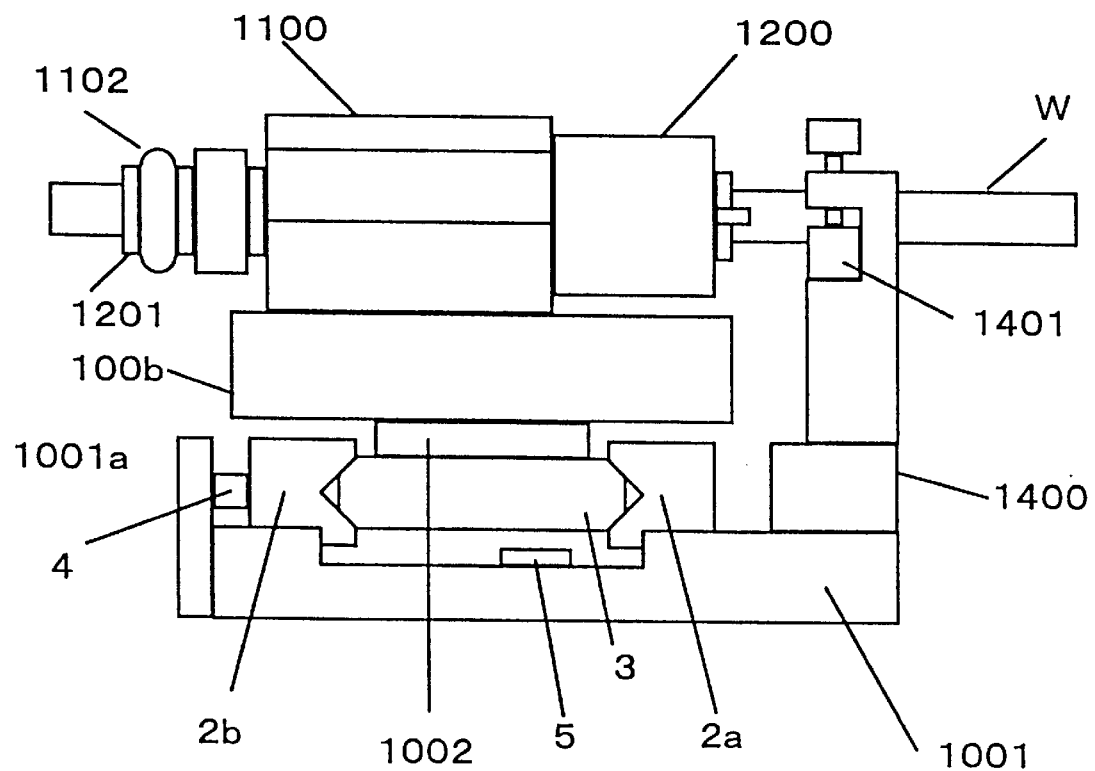

FIG. 17A
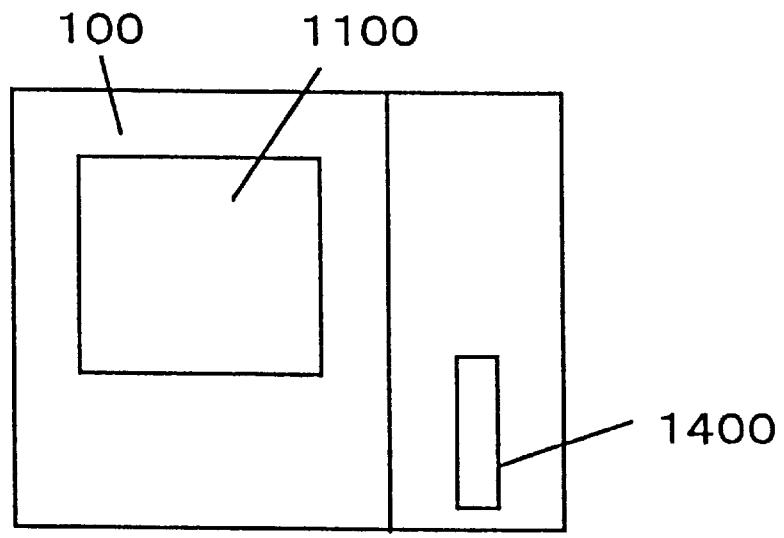
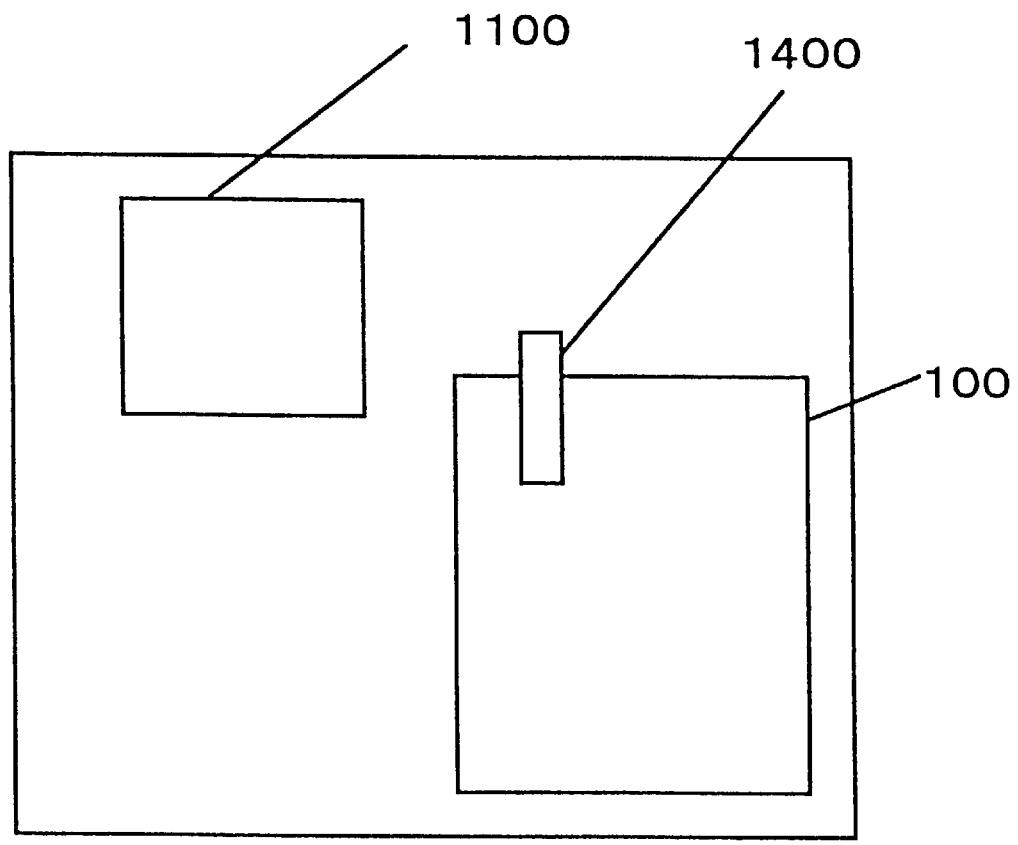
FIG. 17B

ACTUATOR, METHOD OF DRIVING ACTUATOR, COMPUTER-READABLE MEDIUM FOR STORING PROGRAM PROCESSED BY COMPUTER FOR EXECUTING DRIVING METHOD, AND COMPACT MACHINE TOOL UTILIZING ACTUATOR

FIELD OF THE INVENTION

The present invention relates to an actuator enabling side reduction and power saving. The present invention also relates to an actuator driving method which can drive the actuator under best conditions as well as to a computer-readable recording medium containing a program which is processed by a computer to execute the actuator driving method recorded therein. Further the present invention relates to a compact machine tool using the actuator.

BACKGROUND OF THE INVENTION

At present, there have been various types of actuators, which have been widely used in various industrial fields. Further in recent years, because of the needs for energy saving and space saving, there is a strong need for a power-saving and compact size actuator.

As the power-saving and compact size actuator, there has been a so-called mini-actuator. This mini-actuator is manufactured by applying ultra-fine grinding to an inner side of an outer rail formed by drawing to provide a surface on which a ball moves and rotates and also by applying hybrid machining ball circulating machining for an inner block thereof and ball circulating machining for a ball screw nut. The height of a mini-actuator manufactured as described above is around 20 mm.

A servo motor is indispensable for an actuator based on the ordinary type of ball screw including the mini-actuator as described above. To reduce size of an actuator, also it is necessary to minimize the size of the servo motor. At present, compact servo motors each having a diameter of around 20 mm are commercially available.

Further there are various types of micro-actuators, which are important devices for micro-machines gathering hot attentions from the related circles. There are various principles for driving a micro-actuator including static electricity, a piezoelectric element, shape memory alloy, and thermal expansion. Generally, the size of a micro-actuator is in a range from 10 µm to around 1 mm.

Also in recent years, as a means for minimizing a moving mechanism, there has been proposed an actuator based on an inch-worm system. FIG. 18 is a view showing an upper surface of an actuator based on the inch-worm system. In this figure, the reference numeral 802 indicates a guide rail. An H-shaped movable body 803 is provided between guide rails 802, 802. This movable body 803 comprises two holders 831, 832 each perpendicular to the guide rails 802, 802, and a holder section 833 in parallel to the guide rails 802, 802. Piezoelectric elements 834 to 846 are imbedded in the holder sections 831 to 833 respectively. PZT-based piezoelectric ceramics are used as piezoelectric elements 834 to 836. A side wall of each of the holder sections 831 to 833 is thin. The reason is that a space between the side walls can be expanded in association with extension of the piezoelectric elements. The table 804 is attached to an upper section of the movable body 803.

When a voltage is loaded to the piezoelectric element 835, the piezoelectric element 835 extends because of the piezoelectric effect. When the piezoelectric element 835 extends, the holder section 832 expands, and is fixed between the guide rails 802, 802. In this state, a voltage is loaded to the piezoelectric element 836. Then, the piezoelectric element 836 extends, and the holder section 833 expands. When the holder section 833 expands, the holder section 831 moves together with the piezoelectric element 834. Then, a voltage is loaded to the piezoelectric element 834 to expand the holder section 831. With this feature, the holder section 831 is fixed between the guide rails 802, 802.

Then, when loading of a voltage to the piezoelectric element 835 is stopped, the piezoelectric element 835 shrinks to the original size. With this, fixture by the holder section 832 is released. Then, when loading of a voltage to the piezoelectric element 836 is stopped, the piezoelectric element 836 shrinks to the original size, and the holder section 833 shrinks. In association with shrinkage of the holder section 833, the holder section 832 moves. In this actuator 800 based on the inch-worm system, the table 804 is moved by successively executing the sequence as described above.

Examples of various types of actuator were described above, but each of the actuators has problems as described below. At first, in the conventional type of actuator based on the ball-screw system, circulation of balls is required, and there is a limit in reducing the size because of its construction. Also as a servo motor is used, the power consumption is large. At the same time, the micro-actuator is too small in its size so that it is rather difficult to handle and can not practically be used for general industrial purposes.

The conventional type of actuator 800 based on the inch-worm system is smaller as compared to an actuator based on a ball-screw system. However, as a three-piece piezoelectric element is used, further reduction of the size is impossible, and a method of driving the actuator 800 itself is complicated.

SUMMARY OF THE INVENTION

It is an object of the present invention to obtain a compact-sized and power-saving actuator which can easily be driven. It is another object of the present invention to obtain an actuator driving method which can drive the actuator as described above under best conditions, and to obtain a computer-readable recording medium with a program which is processed by a computer to execute the actuator driving method recorded therein. It is still another object of the present invention to obtain a compact machine tool using the actuator therein.

To achieve the objects mentioned above, an actuator according to the present invention comprises a first displacing unit which can fix or change a position thereof against a guide by displacing; a second displacing unit which is connected to said first displacing unit and displaces in at least a direction different from that in which said first displacing unit displaces; and a holder which maintains said second displacing unit on said guide with a force weaker than a force of said first displacing unit for fixing and moves according to the displacement of said second displacing unit.

An actuator according the present invention comprises a guide in which two guide rails are provided at a certain space from each other; a first displacing unit provided between the guide rails of this linear guide and fixed between said guide rails by displacing; a second displacing unit which displaces in a direction crossing perpendicular to the displacing direction of this first displacing unit; and a holder which connects said first displacing unit to said second displacing unit, holds said second displacing unit between said guide rails with a force weaker than a force of said first displacing unit for fixing and moves according to the displacement of said second displacing unit.

The actuator according to the present invention further comprises a holding force adjuster for adjusting a holding force of said holder by adjusting a space between the guide rails of said linear guide.

In the actuator according to the present invention described above, said holding force adjuster adjusts a holding force of said holder with an elastic body provided on at least one of the guide rails to give a pressing force to the guide rail.

In another embodiment of the actuator according to the present invention described above, said holding force adjuster adjusts a holding force of said holder with a displacing unit provided on at least one of the guide rails to give a pressing force said guide rail by displacement of this displacing unit.

The actuator according to the present invention further comprises a cyclically displacement instructing unit for giving a cyclic displacement instruction to said first displacing unit and also giving a cyclic displacement instruction having a phase difference from the cyclic displacement instruction given to said first displacing unit to said second displacing unit; and a movement rate resolution changing unit for changing a resolution for a movement rate by changing said phase difference.

In another embodiment, the actuator according the present invention further comprises a cyclic displacement instructing unit for giving a cyclic displacement instruction to said first displacing unit and also giving a cyclic displacement instruction having a phase different from the cyclic displacement instruction given to said first displacing unit to said second displacing unit; and a moving speed changing unit for changing a moving speed by changing said cycle.

An actuator driving method according the present invention comprises, for driving the actuator as described above, a step of fixing a position thereof against said guide rails by displacing said first displacing unit; a step of displacing said second displacing unit and also moving said holder in association with displacement of said second displacing unit; a step of returning said first displacing unit to the original position; and a step of returning said second displacing unit to the original position and moving said first displacing unit in association with the returning movement of said second displacing unit.

In another embodiment, an actuator driving method according to the present invention comprises, for driving the actuator as described above, a step of displacing said second displacing unit and also moving said first displacing unit in association with the displacement; a step of fixing a position thereof against said guide rails by displacing said first displacing unit; a step of returning said second displacing unit to the original position and also moving said holder in association with the returning movement of said second displacing unit; and a step of returning said first displacing unit to the original position.

In another embodiment, an actuator driving method according to the present invention comprises, for driving the actuator as described above, a step of giving a cyclic displacement instruction to said first displacing unit; and a step of giving a cyclic displacement instruction having a phase difference from the cyclic displacement instruction given to said first displacing unit to said second displacing unit.

The actuator driving method according to the present invention as described above further comprises a step of changing a resolution for a movement rate by changing said phase difference.

The actuator driving method according to the present invention as described above, a step of changing a moving speed by changing said cycle.

In another aspect, the present invention comprises a computer-readable recording medium containing therein a program for processing by a computer to execute an actuator driving method as described above.

In another aspect, the present invention comprises a compact machine using the actuator described above as a moving unit.

In another embodiment, a compact machine tool according to the present invention uses the actuator described above as a moving unit to move at least the spindle side with said moving unit and fix the blade side.

Other objects and features of this invention will become understood from the following description with reference to the accompanying drawings.

BRIEF DESCRIPTION OF THE DRAWINGS

FIG. 5 is a graph showing a waveform of a voltage loaded to a piezoelectric element;

FIGS. 11A and 11B are a top view and a side view each showing the actuator according to Embodiment 3 of the present invention;

FIGS. 14A and 14B are a top view and a side view each showing the compact lathe shown in FIG. 13;

FIGS. 17A and 17B are explanatory views for comparison of difference in a floor area due to difference in arrangement of components in a lathe.

DETAILED DESCRIPTION OF THE PREFERRED EMBODIMENTS

Detailed description is made below with reference to the drawings for embodiments of the actuator according to the present invention, a method of driving the same, a computer-readable recording medium with a program which is processed by a computer to execute the driving method recorded therein, and a compact machine tool using the actuator. It should be noted that the present invention is not limited to these embodiments.

Figure 1:
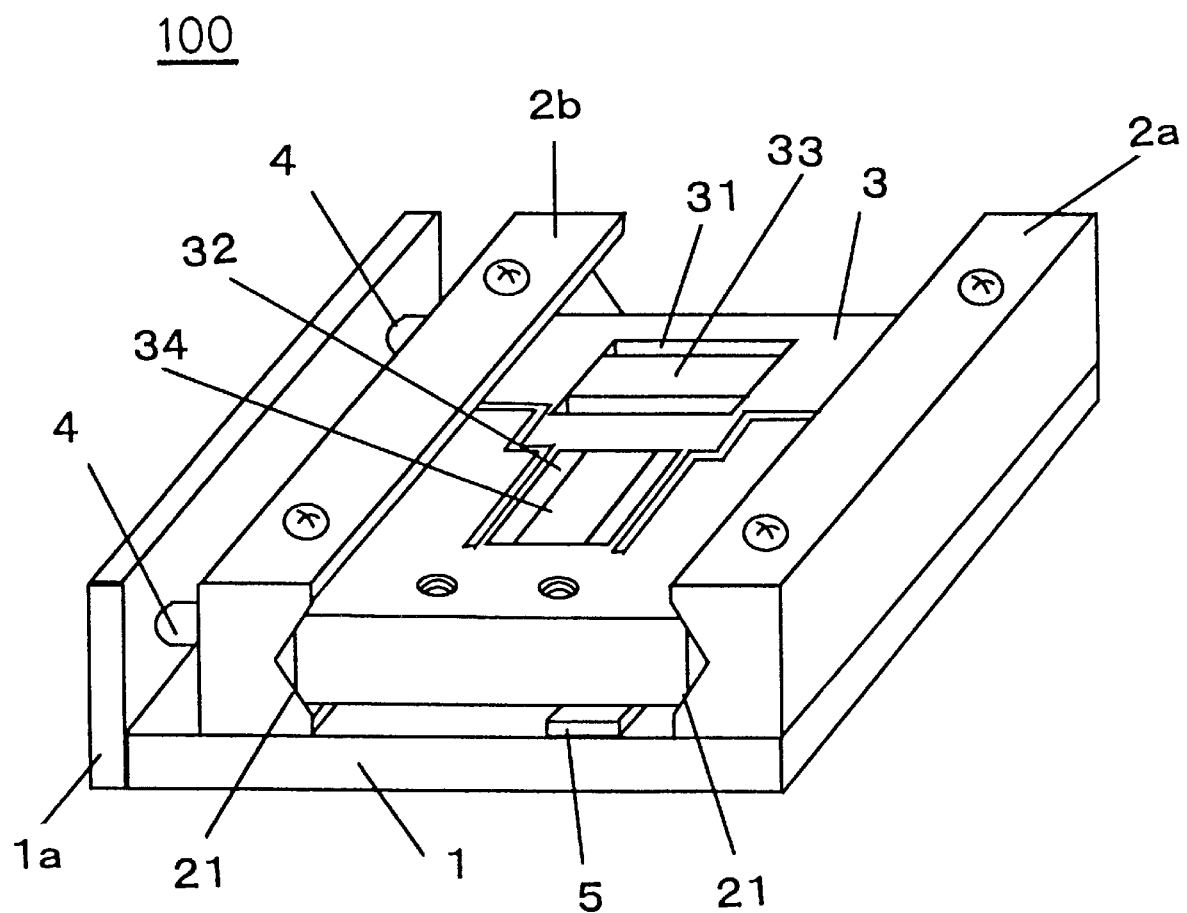
FIG. 1 is a perspective view showing the actuator according to Embodiment 1 of the present invention.
Figure 2A:
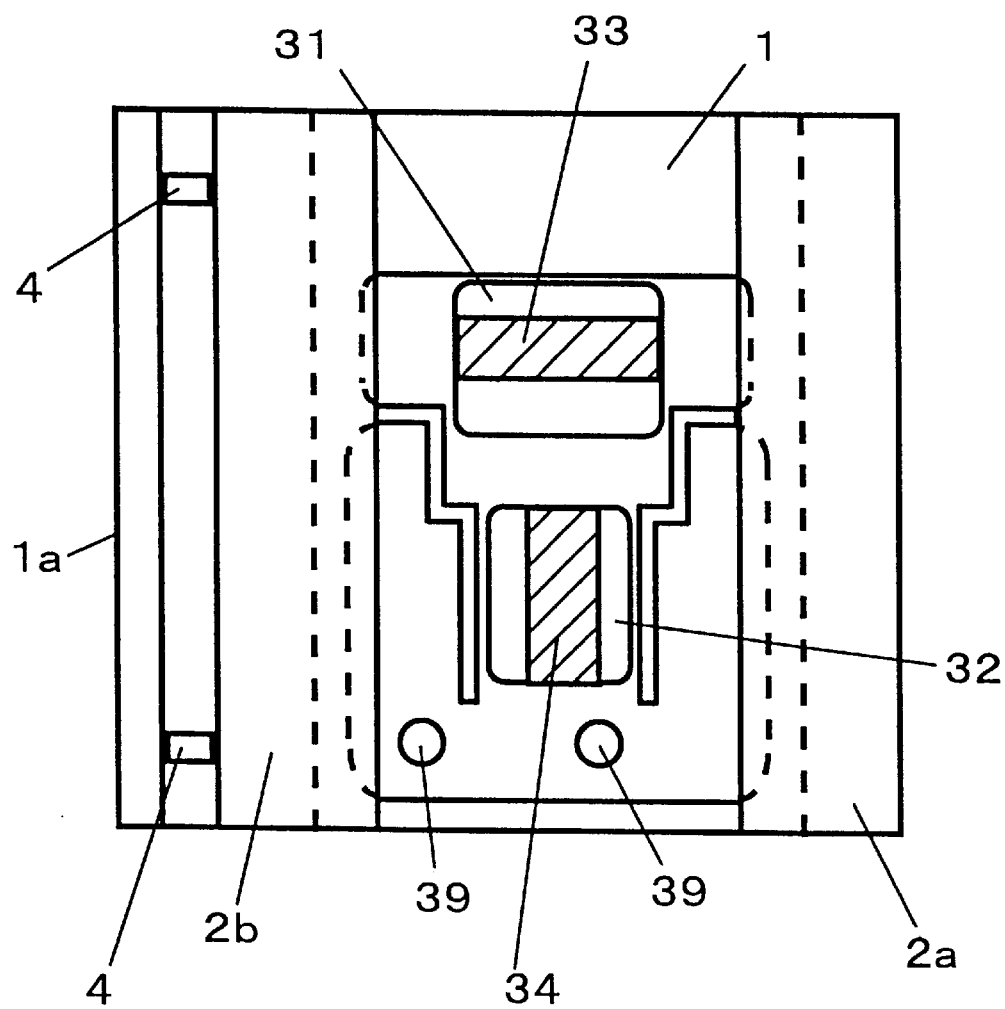
FIGS. 2A and 2B are a top view and a side view each showing the actuator shown in FIG. 1.
Figure 2B:
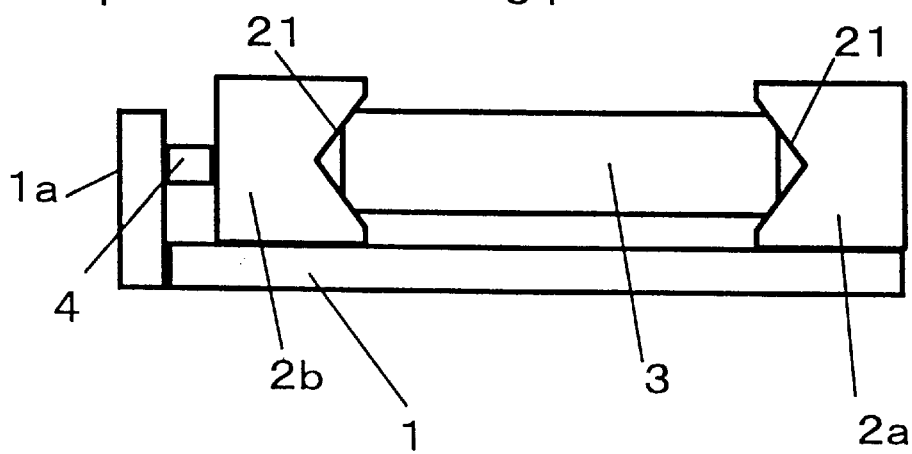

FIG. 1 is a perspective view showing an actuator according to Embodiment 1 of the present invention. FIGS. 2A and 2B are flat views and a side view each showing the actuator shown in FIG. 1. This actuator 100 comprises a base substrate 1, guide rails 2a, 2b provided at parallel positions on this base substrate 1, a movable body 3 held between these guide rails 2a, 2b, and position adjusting screws 4, 4 each for adjusting positions of the guide rails 2a, 2b. A preferred size of the actuator 100 having the configuration as described above is 22 mm (length)×25 mm (depth)×8 mm (height) or the like.

Provided on the opposing surfaces of the guide rails 2, 2 are V-shaped grooves 21, 21. The guide rail 2a is set to the base substrate 1 with screws. The guide rail 2b is fixed with a screw after a space between the guide rails 2a, 2b are adjusted with the position adjusting screws 4, 4. The position adjusting screws 4, 4 are screwed from the side wall 1a of the base substrate 1. Also, a linear scale 5 is attached to a bottom side of the movable body 3.

Figure 3:
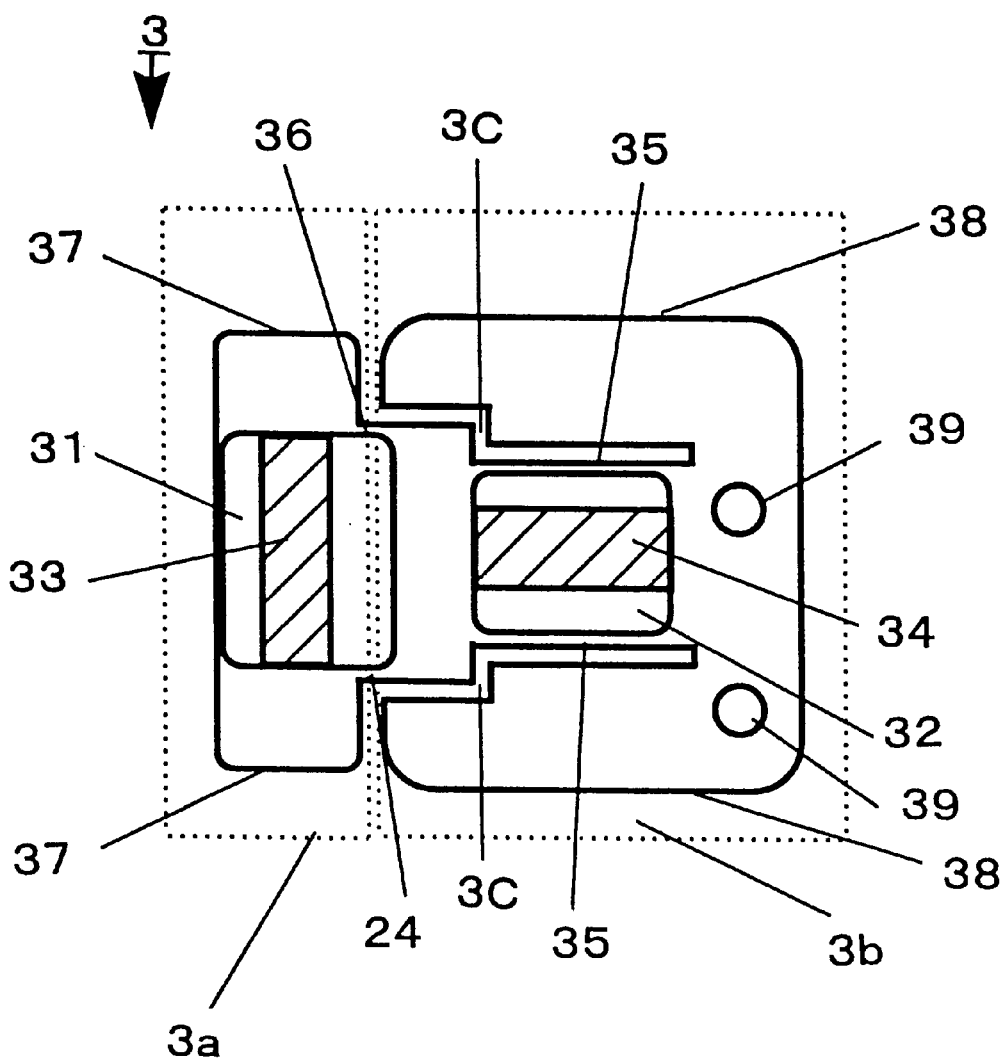
FIG. 3 is a top view showing construction of the movable body shown in FIG. 1.

FIG. 3 is a flat view showing a construction of the movable body 3 shown in FIG. 1. This movable body 3 is manufactured by way of applying wire discharge machining to a flat plate with the entire dimensions of 20 mm×14 mm and the thickness of 4 mm. This movable body 3 has a stepped notch section 3c. Further, the movable body 3 has a holder section 31 which is long in a direction perpendicular to the guide rails 2a, 2b and a holder section 32 which is long in the horizontal direction in parallel to the guide rails 2a, 2b. Piezoelectric elements 33, 34 are embedded in these holder sections 31, 32.

Lengths of these holder sections 31, 32 are lightly shorter than those of the piezoelectric elements 33, 34, so that a surplus pressure of around 10N is generated when the piezoelectric elements 33, 34 are press-fit therein. Width of supporting sections 35, 35 each functioning as a side wall of the holder section 31 is 0.2 mm. The numeral 36 indicates a joint section. Width of this joint section 36 is 0.4 mm. A distance between a contact section 37 and a contact section 37 is shorter by 0.005 mm than a distance between a contact section 38 and a contact section 38. It is defined herein that the side of piezoelectric element 33 from the joint sections 36, 36 is a section 3a inside the movable body and the side of the piezoelectric element 34 is a section 3b inside the movable body. The movable range of this movable body 3 is around 4 mm.

A layered type of PZT-based piezoelectric ceramics is used for the piezoelectric elements 33, 34. The layered type of PZT-based piezoelectric ceramics is used because it has a large displacement rate and is excellent in accuracy, response speed, and driving force. Preferably, the of the piezoelectric element is 3 mm×3 mm×8 mm. It should be noted that any component other than a piezoelectric element may be used so far as it is displaceable. The reference numeral 39 indicates a fixing hole for linking two movable bodies.

Figure 4A:
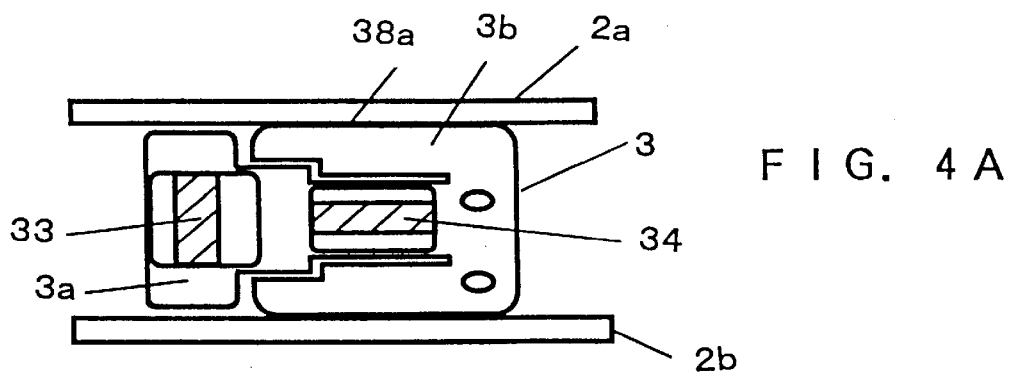
FIGS. 4A to 4E are explanatory views showing a moving mechanism for the movable body shown in FIG. 1.
Figure 4B:
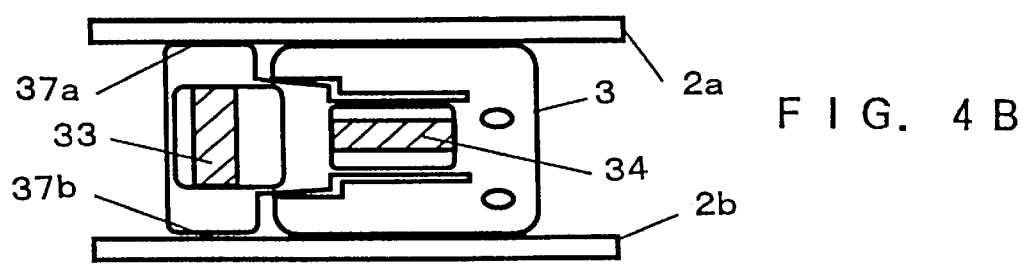

FIGS. 4A to 4E are explanatory views showing a moving mechanism for the movable body 3. As shown in FIG. 4A, in the initial state, the movable body 3 is held and kept in a static state due to a frictional force between the contact sections 38a, 38b and the guide rails 2a, 2b. Then, as shown in FIG. 4B, when a voltage is loaded to the piezoelectric element 33, extension is generated in the piezoelectric element 33, and the section 3a inside the movable body is expanded. When the section 3a inside the movable body is expanded, the contact sections 37a, 37b are pressed to the guide rails 2a, 2b. With this, the section 3a inside the movable body is fixed between the guide rails 2a, 2b.

Figure 4C:
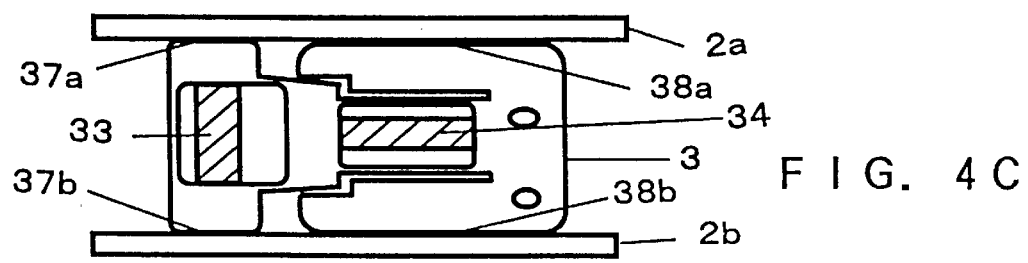

Then, when a voltage is loaded in the state where the section 3a inside the movable body is fixed, extension is generated in the piezoelectric element 34. A force caused by extension of this piezoelectric element 34 is larger than a frictional force between the contact sections 38a, 38b and the guide rails 2a, 2b. The force caused by extension of the piezoelectric element 34 is smaller than a frictional force between the contact sections 37a, 37b and the guide rails 2a, 2b. For this reason, as shown in FIG. 4C, the section 3b inside the movable body moves in the rightward direction in the figure.

Figure 4D:
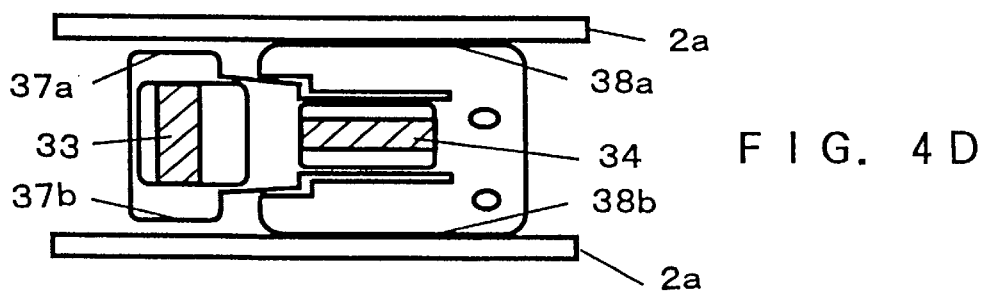
Figure 4E:
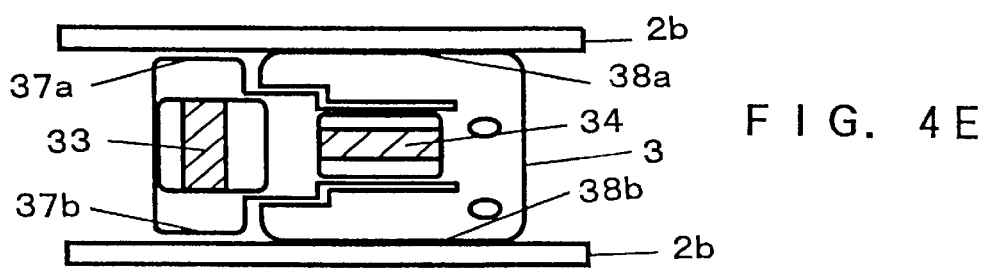

Then, when loading of a voltage to the piezoelectric element 33 is stopped, as shown in FIG. 4D, the contact sections 37a, 37b are separated from the guide rails 2a, 2b. Then, when loading of a voltage to the piezoelectric element 34 is stopped, as shown in FIG. 4E, the piezoelectric element 34 shrinks. When the piezoelectric element 34 shrinks, the section 3a inside the movable body moves rightward in the figure in association with shrinkage of the piezoelectric element 34. By repeating the series of operations, the movable body 3 moves in one direction.

Then, by providing a phase difference between a voltage loaded to the piezoelectric element 33 and a voltage loaded to the piezoelectric element 34, a movement rate of the movable body 3 was measured. FIG. 5 is a graph showing waveforms of voltages loaded to the piezoelectric elements 33, 34. The waveform A (shown with a dotted line in the figure) indicates a voltage loaded to the piezoelectric element 33. The waveform B (shown with a solid line in the figure) indicates a voltage loaded to the piezoelectric element 34. It should be noted that the voltage loaded to the piezoelectric elements 33, 34 is 60 V. As shown in the figure, when a voltage is loaded to each of the piezoelectric elements 33, 34 with a phase difference C, the movable body 3 moves. The moving mechanism playing a role in this step was already described above (Refer to FIGS. 4A to 4E). As a result of measurement, a movement rate for one cycle (1 step) is different in association with the phase difference C, and it was at a maximum around 2.7 $\mu$m and at a minimum around 0.3 $\mu$m.

Figure 6:
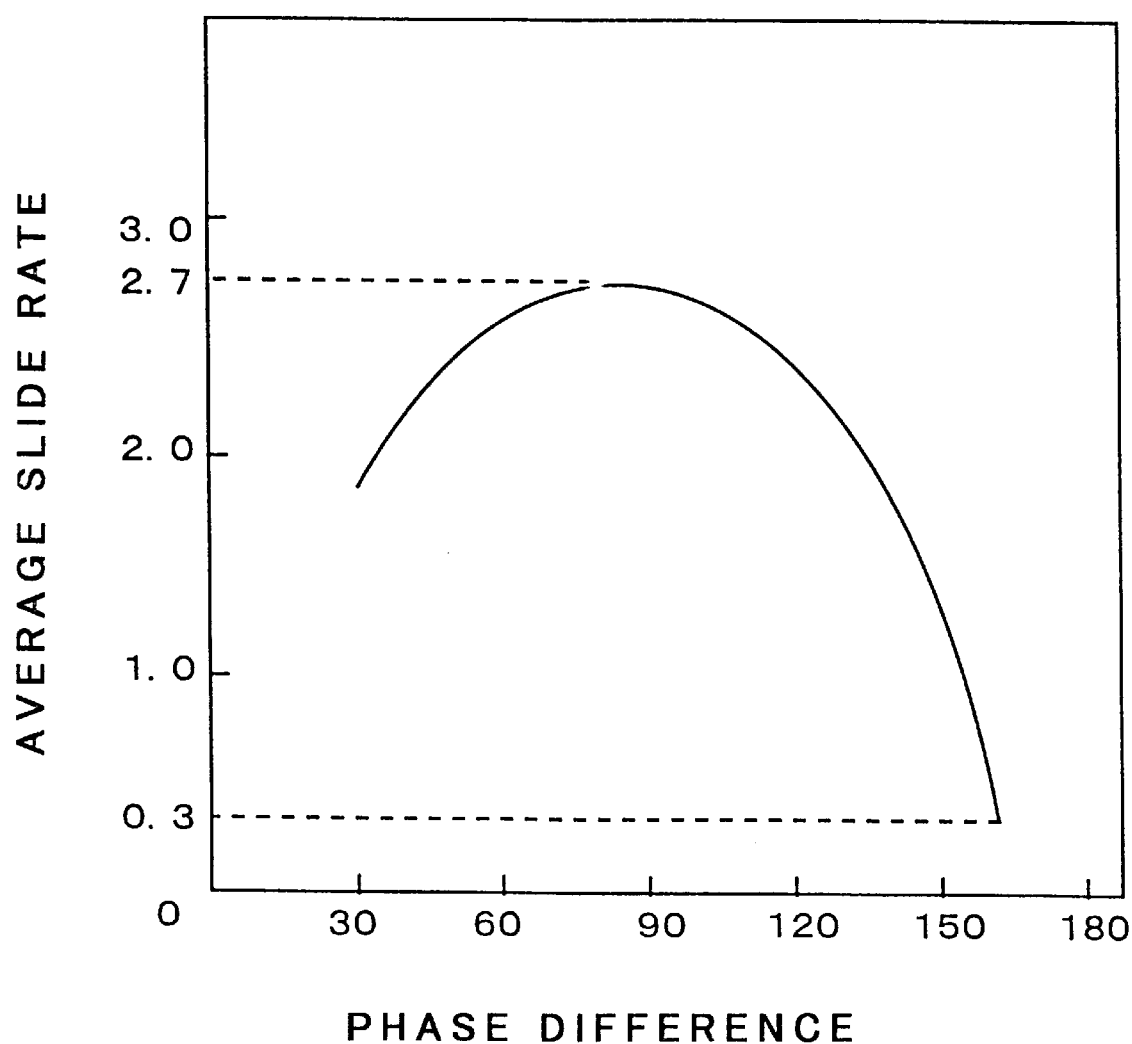
FIG. 6 is a graph showing change in a movement rate in a case where a phase difference is changed.

FIG. 6 is a graph showing a change in the movement rate in a case when the phase difference is changed. As a result of measurement, when the phase difference was 90°, the movement rate was the 2.7 $\mu$m, which was the maximum. Also, when the phase difference was 165°, the movement rate was 0.3 $\mu$m, which was the minimum. Further it was found that the movement rate continuously changes when the phase difference changes. From this fact, it was also found that minute movement of the movable body 3 can be controlled by changing the phase difference. Also it was found that a direction of movement of the movable body 3 is reversed at the phase difference of 180° as a border.

Figure 7:
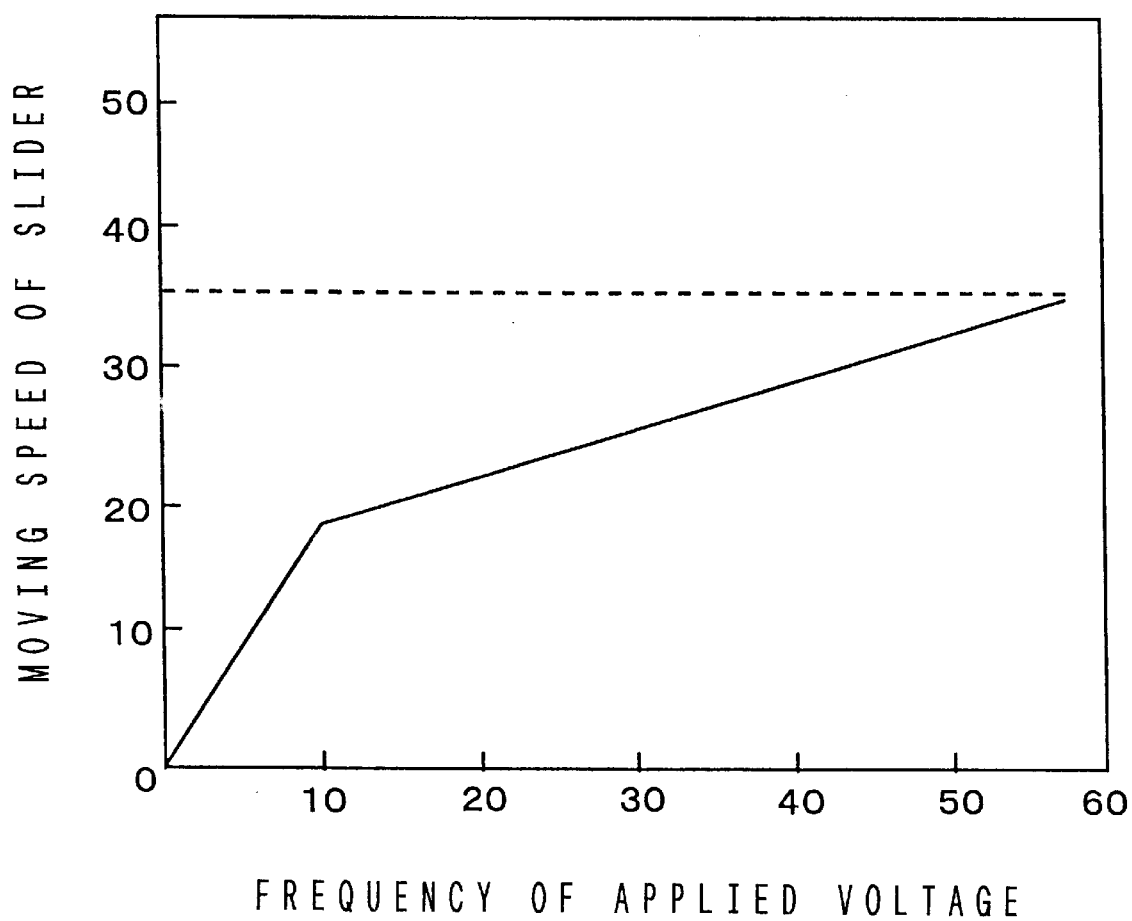
FIG. 7 is a graph showing a relation between a frequency and a moving speed.

Then measurement was carried out for a correlation between a frequency and a moving speed. FIG. 7 is a graph showing a relation between a frequency and a moving speed in a case where the phase difference is 101° and an input voltage value is 60 V. As a result of measurement, it was found that, when a frequency is changed, a moving speed of the movable body 3 continuously changes. Also it was found that a moving speed of the movable body 3 can be adjusted in a wide range of around 1 to 35 µm/sec. It should be noted that a slope of the graph changes at the frequency of around 10 Hz as a border. This phenomenon is caused due to smoothness in sliding of the movable body 3. Smoothness in sliding of the movable body 3 can be set by adjusting a holding force for the movable body 3 (a frictional force with the guide rail 2).

Figure 8:
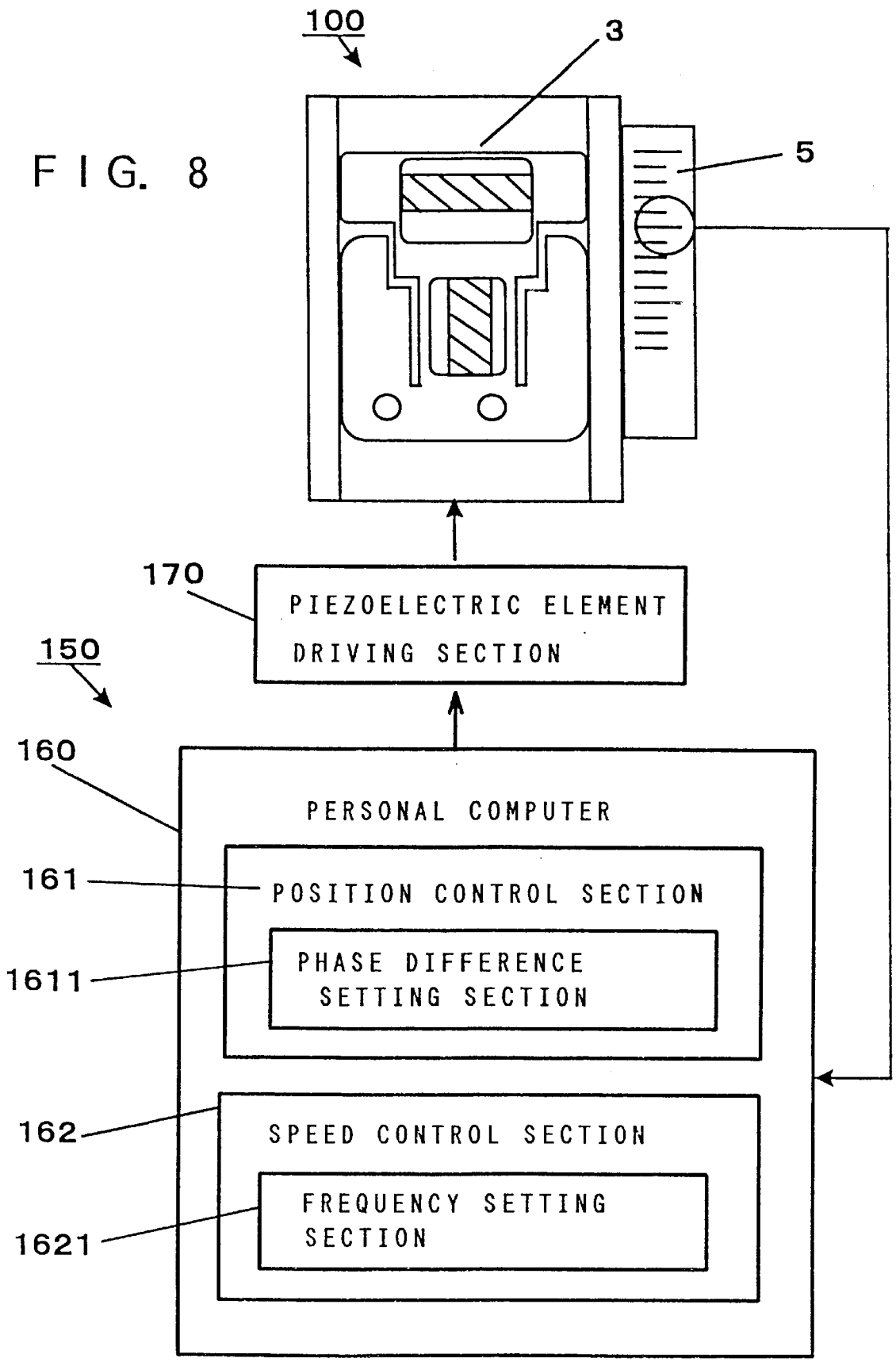
FIG. 8 is a block diagram showing a driving unit for the actuator shown in FIG. 1.

FIG. 8 is a block diagram showing a driving unit 150 for this actuator. This driving unit 150 moves the movable body 3 by loading a particular frequency with a different phase to each of the piezoelectric elements 33, 34 respectively to provide a sequence control for the actuator 100. The driving unit 150 comprises a personal computer 160 forming a closed loop with a linear scale 5 for providing feedback controls and a piezoelectric element driving section 170 which amplifies signals from the personal computer 160.

The personal computer 160 has a position control section for controlling a position of the movable body 3 and a speed control section 162 for controlling a moving speed of the movable body 3. The position control section 161 has a phase difference setting section 1611 for setting a phase difference between voltages loaded to the piezoelectric elements 33, 34. The speed control section 162 has a frequency setting section 1621 for setting a frequency of each of the voltages loaded to the piezoelectric elements 33, 34.

Figure 9:
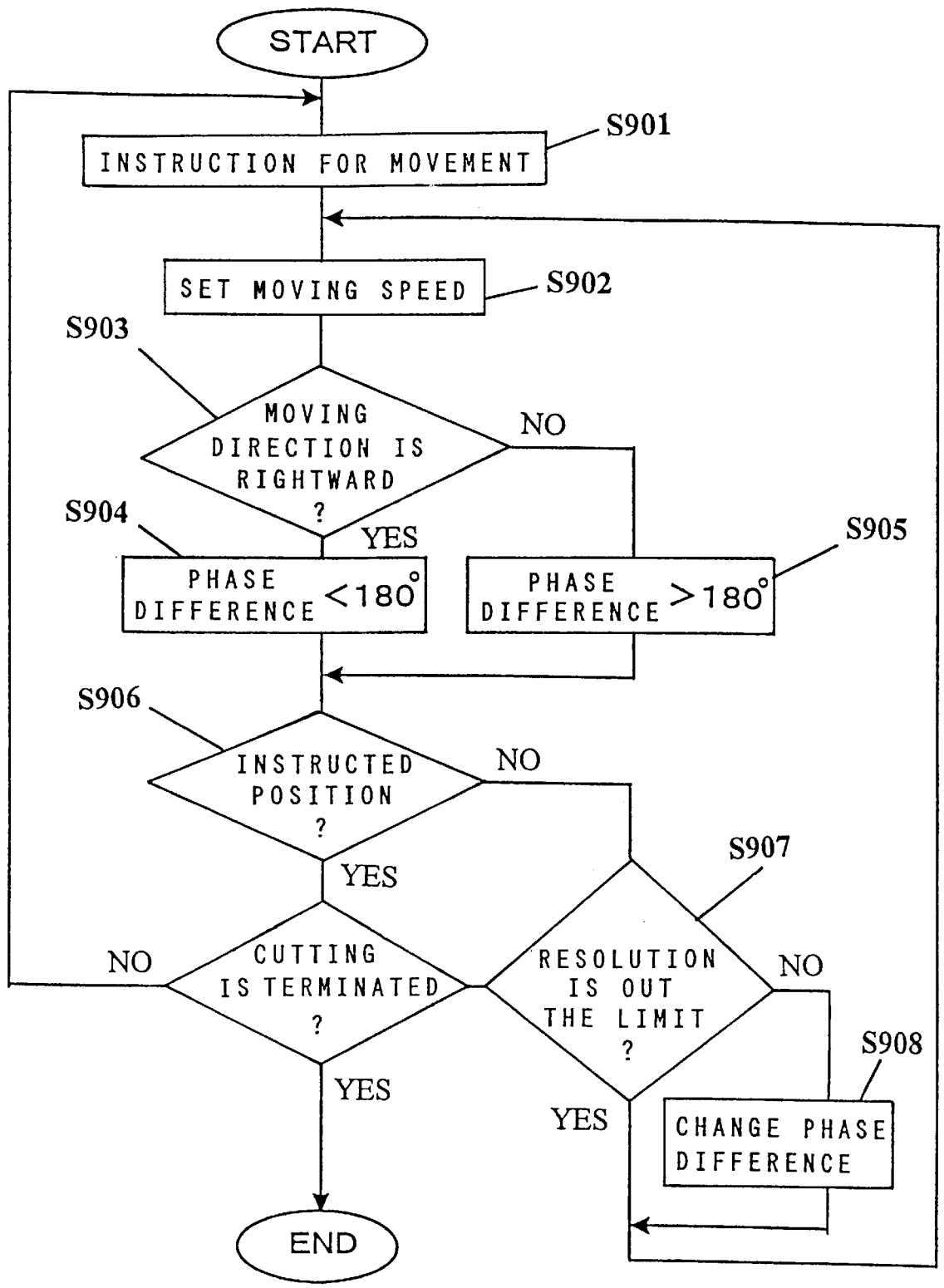
FIG. 9 is a flowchart showing a sequence for driving an actuator with the driving unit shown in FIG. 8.

FIG. 9 is a flowchart showing a sequence for driving the actuator 100 using the driving unit 150 shown in FIG. 8. In step S901, an instruction for movement is issued from the personal computer 160. In step S902, a moving speed of the movable body 3 is set according to an instruction for movement from the personal computer 160. A moving speed of the movable body 3 is set by changing a frequency of a voltage loaded to each of the piezoelectric elements 33, 34. Setting of a frequency is executed by the frequency setting section 1621.

In step S903, a moving direction of the movable body 3 decided. The moving direction is decided by referring an initial position of the moving body 3 as a reference. As the moving direction is reversed at the phase difference of 180° as a border, the moving direction is decided by making the phase difference larger or smaller than 180° (steps S903 to S905). In the case shown in FIGS. 4A to 4E, in a case where the moving direction is rightward, a phase difference is set to a value smaller than 180° (step S904). In a case where the moving direction is leftward, the phase difference is set to a value larger than 180° (step S905).

In step S906, feedback control is executed by a closed loop circuit comprising the linear scale 5.

In step S907, determination is made as to whether a resolution for positioning of the movable body 3 is at the limit or not. The resolution for positioning is decided according to the phase difference. For this reason, a phase difference is changed to provide further minute positioning control (step S908). In this actuator 100, the resolution becomes highest when the phase difference is 165°. When the phase difference is 165°, the movement rate in 1 step is 0.3 µm. Setting of the phase difference is executed by the phase difference setting section 1611. It should be noted that the processing sequence described above is recorded in a recording medium which can be read by the personal computer 160 (such as a floppy disk, or an optical disk).

Figure 10A:
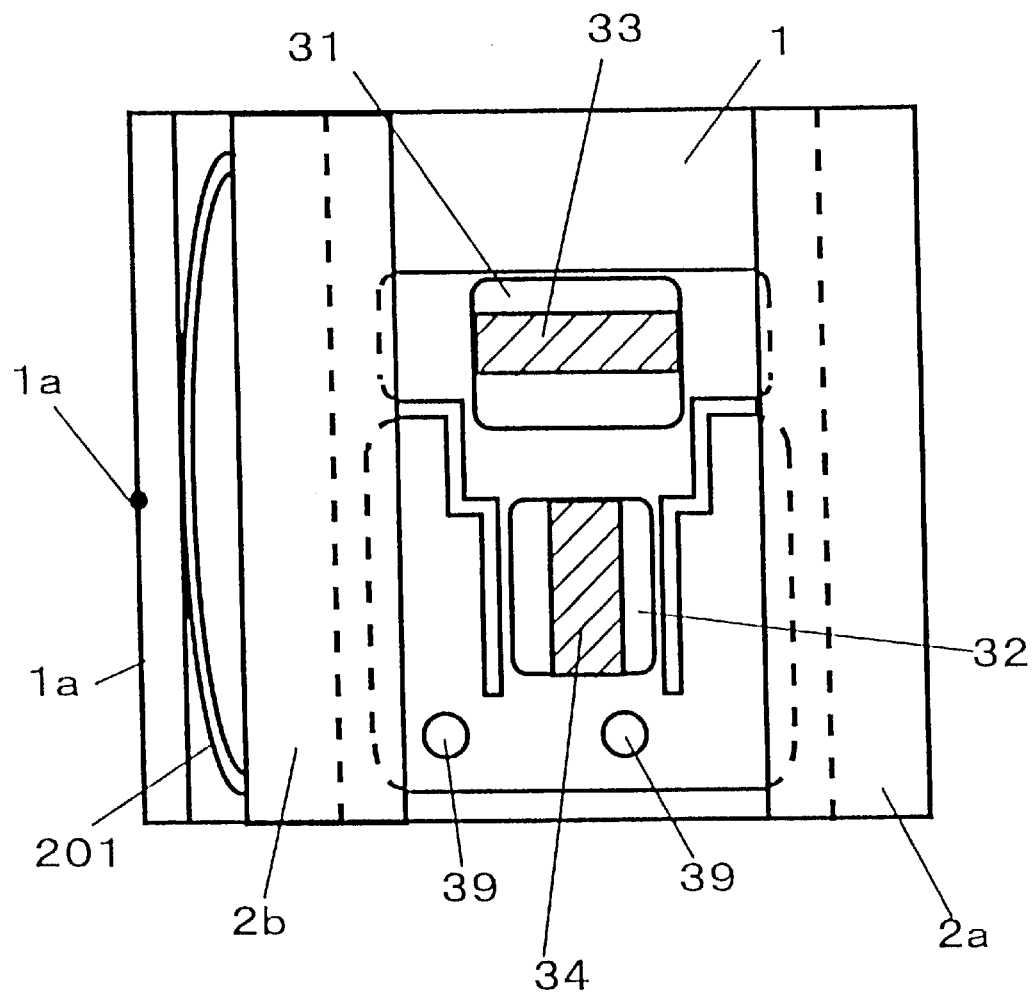
FIGS. 10A and 10B are is a top view and a side view each showing the actuator according to Embodiment 2 of the present invention.
Figure 10B:
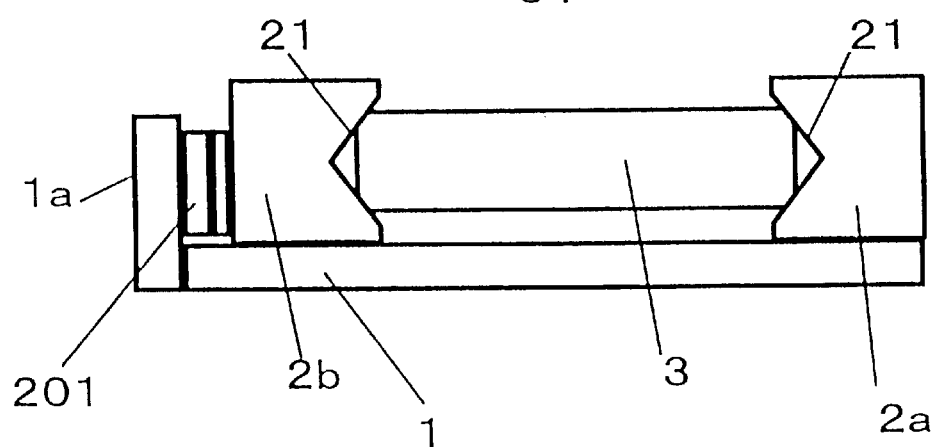

FIGS. 10A and 10B are a top view and a side view each showing an actuator according to Embodiment 2 of the present invention. This actuator 200 is characterized in that a spring 201 is used in place of the position adjusting screws 4, 4 for the actuator 100. Other portions of this configuration are the same as those in Embodiment 1.

A curved plate spring is used for the spring 201. This spring 201 is incorporated between the guide rail 2b and the side wall 1a of the base substrate 1. A frictional force between the guide rails 2a, 2b and the movable body 3 can be changed by changing strength of the spring 201. This spring 201 can easily be attached or detached.

When a desired frictional force is obtained by adjusting the spring 201, the guide rail 2b is fixed to the base substrate 1 with screws. Also an adjusting screw may be provided at a portion 1a' at which the spring 201 contacts the side wall 1a of the base substrate 1. A pressing force of the spring 201 can be adjusted by screwing this adjusting screw to a desired extent. Further, a piezoelectric element may be incorporated in place of the spring 201. It is possible to change a frictional force between the guide rails 2a, 2b and the movable body 3 instantaneously by loading a voltage to the piezoelectric element. If the piezoelectric element is kept energized, fixing with screws is not required.

FIGS. 11A and 11B are a top view and a side view each showing an actuator according to Embodiment 3 of the present invention. This actuator 300 is obtained by changing construction of the actuator 100 according to Embodiment 1 of the present invention to a rotary one.

A base substrate 301 has a disk-shaped form. Guide rails 302a, 302b are attached to a top surface of the base substrate 301. The guide rails 302a, 302b are divided at a height of the vertex of the V-shaped grooves 321a, 321b. A movable body 303 used in this embodiment is substantially the same as that used in Embodiment 1 of the present invention. Curvature of each of the contact sections 337a, 337b of the movable body 303 coincides with a curvature of the guide rails 302a, 302b. Similarly, curvature of the contact sections 338a, 338b of the movable body 303 coincides with the curvature of the guide rails 302a, 302b. The piezoelectric element 333 is located in the radial direction. The piezoelectric element 334 is located in a direction perpendicular to the radial direction.

Three pieces of the movable body 303 are used. The movable bodies 303 are positioned at an angle of 120° from each other. The reference numeral 360 indicates a table. A lower section 360a of this table 360 is linked to an upper section 303a of each movable body 303. A central shaft 361 of the table 360 is supported by a thrust bearing 362.

Figure 12:
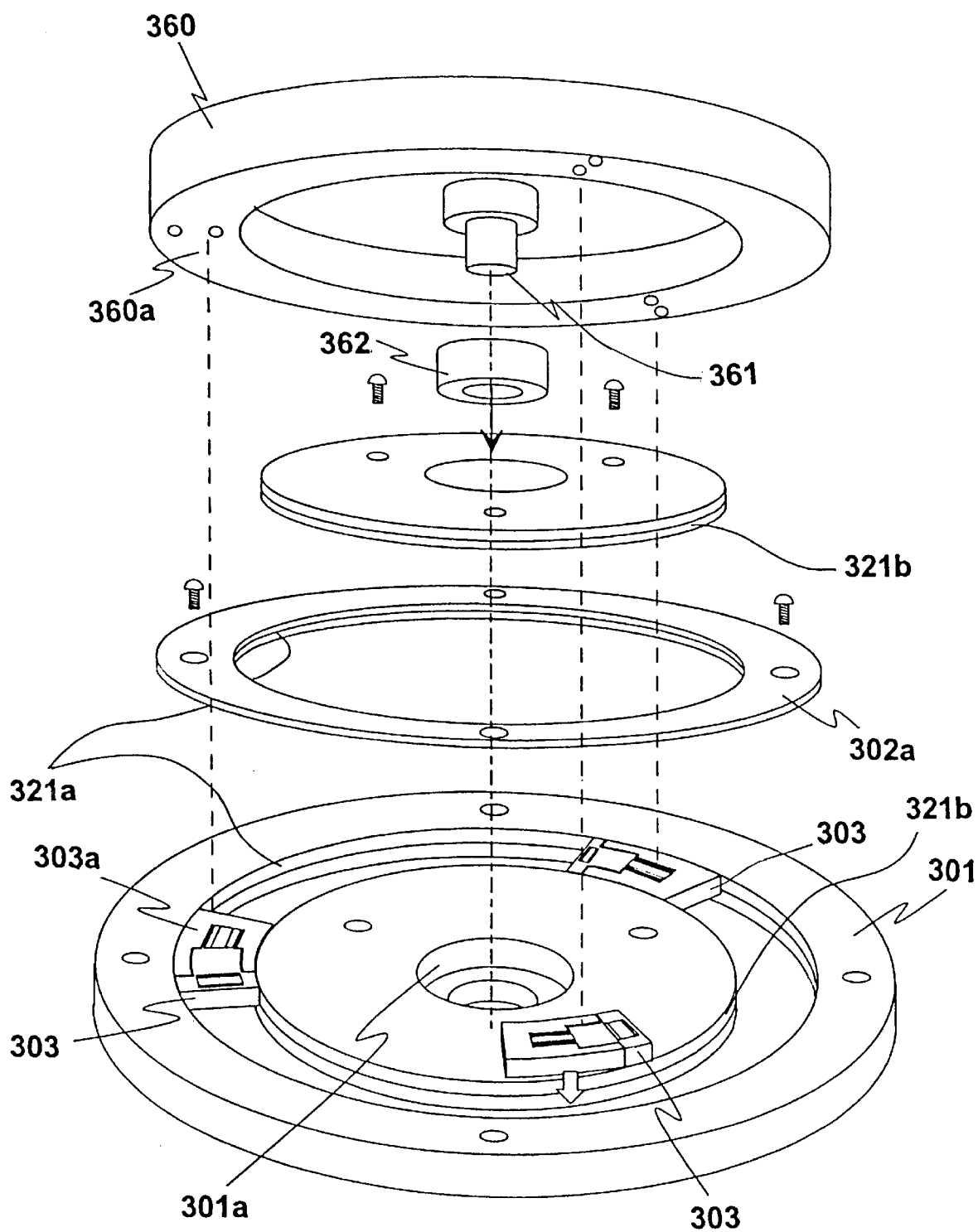
FIG. 12 is an assembly diagram showing the actuator shown in FIGS. 11A and 11B are.

FIG. 12 is an assembly view showing the actuator 300 shown in FIG. 11. At first, the movable body 303 is placed on the base substrate 301. Then, the guide rail 302a is attached to the base substrate 301. Similarly, the guide rail 302b is attached to the base substrate 301. When the guide rails 302a, 302b have been attached thereto, the movable body 303 is supported by the V-shaped grooves 321a, 321b. Then, the thrust bearing 362 is embedded in the bearing section 301a of the base substrate 301. Then, a central shaft 361 of the table 360 is embedded in this thrust bearing 362. Finally, a bottom surface 360a of the table 360 is linked to a top surface 303a of each movable body 303.

This actuator 300 can be driven by the driving unit 150 similar to that in Embodiment 1. It should be noted that the number of the movable bodies is not always limited to 3.

Figure 13:
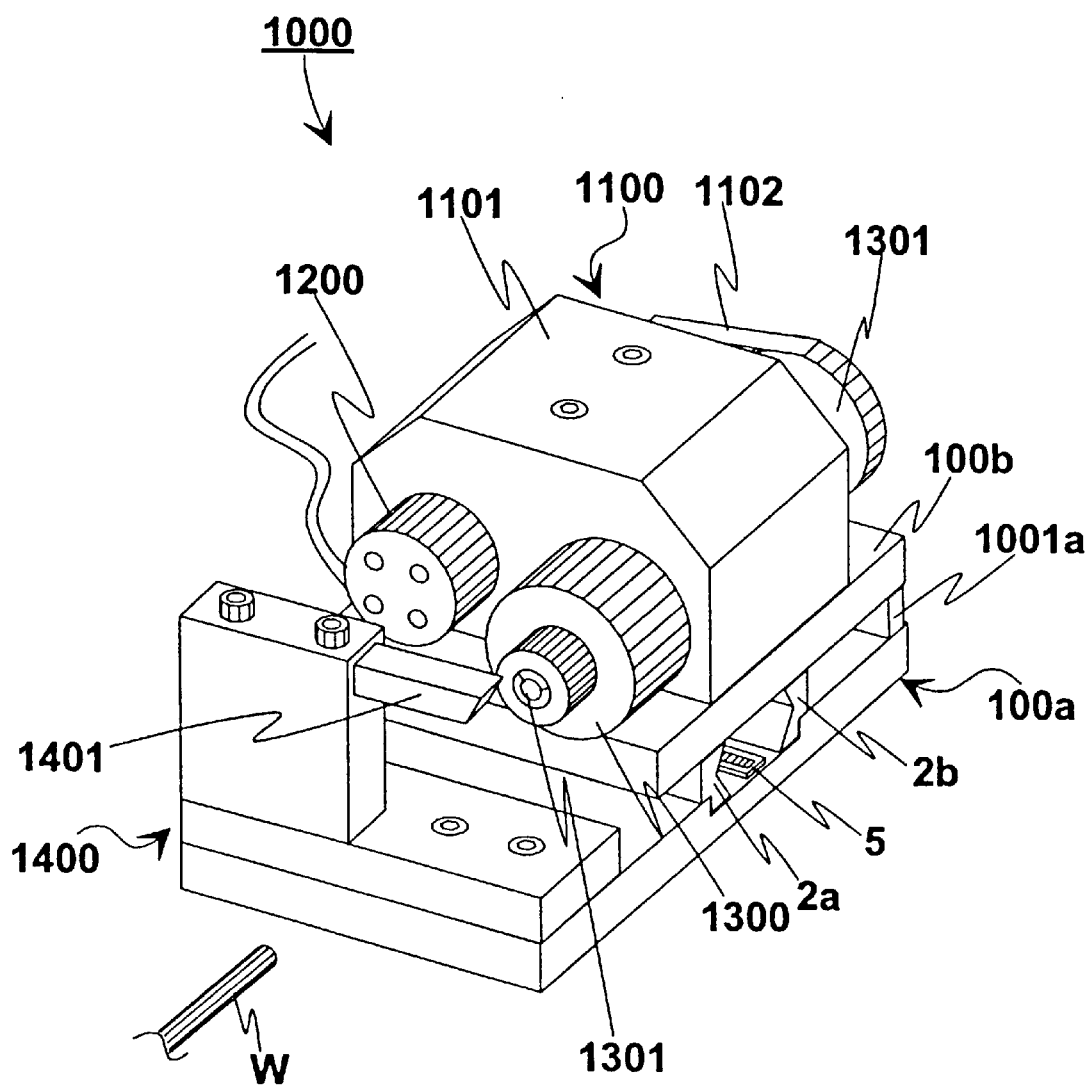
FIG. 13 is a perspective view showing the compact lathe according to Embodiment 4 of the present invention.

FIG. 13 is a perspective view showing a compact lathe according to Embodiment 4 of the present invention. FIGS. 14A and 14B are top views and a side view each showing the compact Lathe shown in FIG. 13. In this compact lathe 1000, the actuators 100 according to Embodiment 1 are positioned in directions perpendicular to each other to form the Z-X axes. Also not a blade base side, but the spindle side is controlled for its movement.

At first, on the bed 1001, an actuator 100a for movement in the Z-axial direction is assembled. At first, the guide rails 2a, 2b are attached onto the bed 1001 at positions opposing to each other. The guide rail 2a is fixed to the bed 1001 with screws. The guide rail 2b is temporally fixed thereto. Then, the movable body 3 is held between the guide rails 2a, 2b. When the movable body is held between the guide rails 2a, 2b, the position adjusting screw 4 is screwed from the side wall 1001a of the bed 1001 to energize the guide rail 2b. A space between the guide rails 2a, 2b is adjusted with this position adjusting screw 4. When the adjustment is over, the guide rail 2b is fixed to the bed 1001 with screws. Also the linear scale 5 is provided under the movable body 3.

Then, the actuator 100b for movement in the X-axial direction is vertically linked to the actuator 100a. The reference numeral 1002 indicates a linking substrate. This linking substrate 1002 links the movable body 3 for the actuator 100a to the actuator 100b. This actuator 100b has a unit form. A space between guide rails (not shown) incorporated in this actuator unit is previously adjusted. The linear scale (not shown) is provided inside the unit. Also the movable body (not shown) is exposed to outside from a top surface of the actuator 100b.

Then a spindle unit 1100 is attached to an upper section of the movable body of the actuator 100b for movement in the X-axial direction. In the spindle unit 1100, a micro-motor 1200 and a spindle 1300 are arranged in parallel to each other and fixed to each other with a holding block 1101. A pulley 1201 is attached to a rotary shaft of the micro-motor 1200. Also a pulley 1301 is attached to the spindle shaft.

A belt 1102 is spanned between the pulley 1201 attached to the micro-motor 1200 and the pulley 1301 attached to the spindle 1300. A rotational speed of the spindle 1300 can be increased or decreased by changing a diameter of the pulley 1201 for the micro-motor 1200.

The rotational speed of the micro-motor 1200 is 15000 rpm. The rated power is around 1.5 W.

Figure 15:
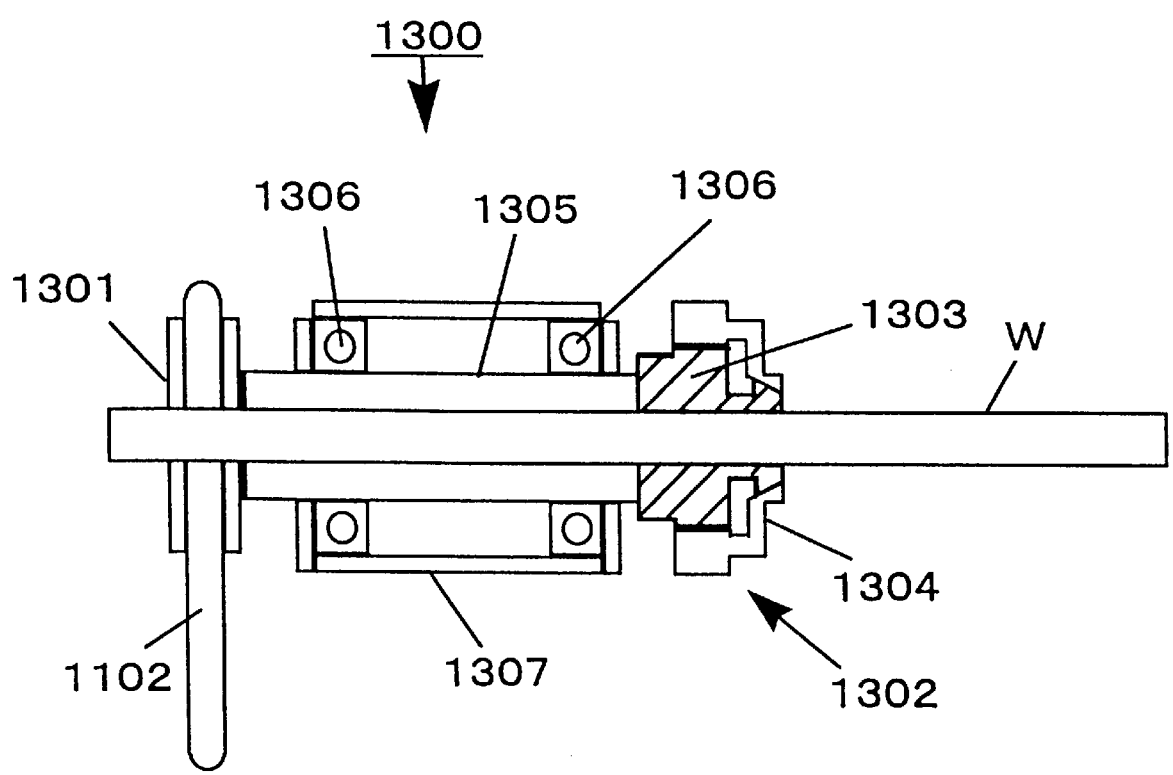
FIG. 15 is a cross-sectional view showing a construction of the spindle shown in FIG. 13.

FIG. 15 is a cross-sectional view showing a construction of the spindle 1300. The reference numeral 1302 indicates a collet chuck. The collet chuck 1302 comprises 4 pieces of split claw 1303 and a holding screw 1304. This collet chuck 1302 can hold a work W having a diameter of up to 2 mm. A sleeve 1305 of the spindle 1300 is supported by miniature ball bearings 1306, 1306 (with an inner diameter of 4.0 mm and an outer diameter of 8.0 mm) and is accommodated within a housing 1307. Also to eliminate restrictions over length of a work, the side of the pulley 1301 is thrusted out to outside.

Also provided on the bed 1001 is a blade base 1400. A bite 1401 is fixed to the blade base 1400 with a screw. This bite 1401 is made of various materials such as a ultra-hard alloy, diamond, or a high-speed steel. A tip of the bite 1401 is at the same height as a rotational center of the spindle 1300.

Figure 16:
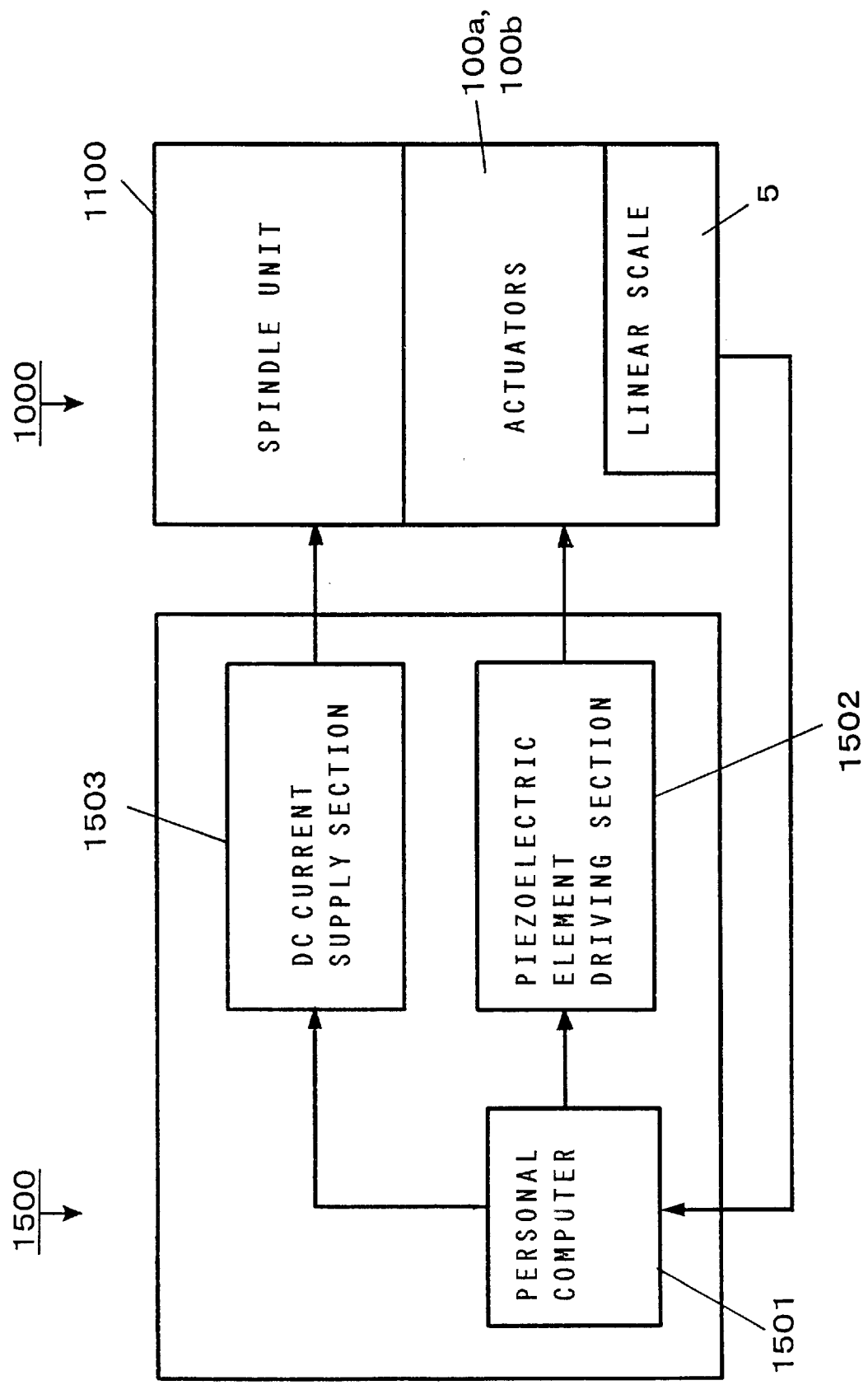
FIG. 16 is a block diagram showing a driving unit for the compact lathe shown in FIG. 13.
Figure 18:
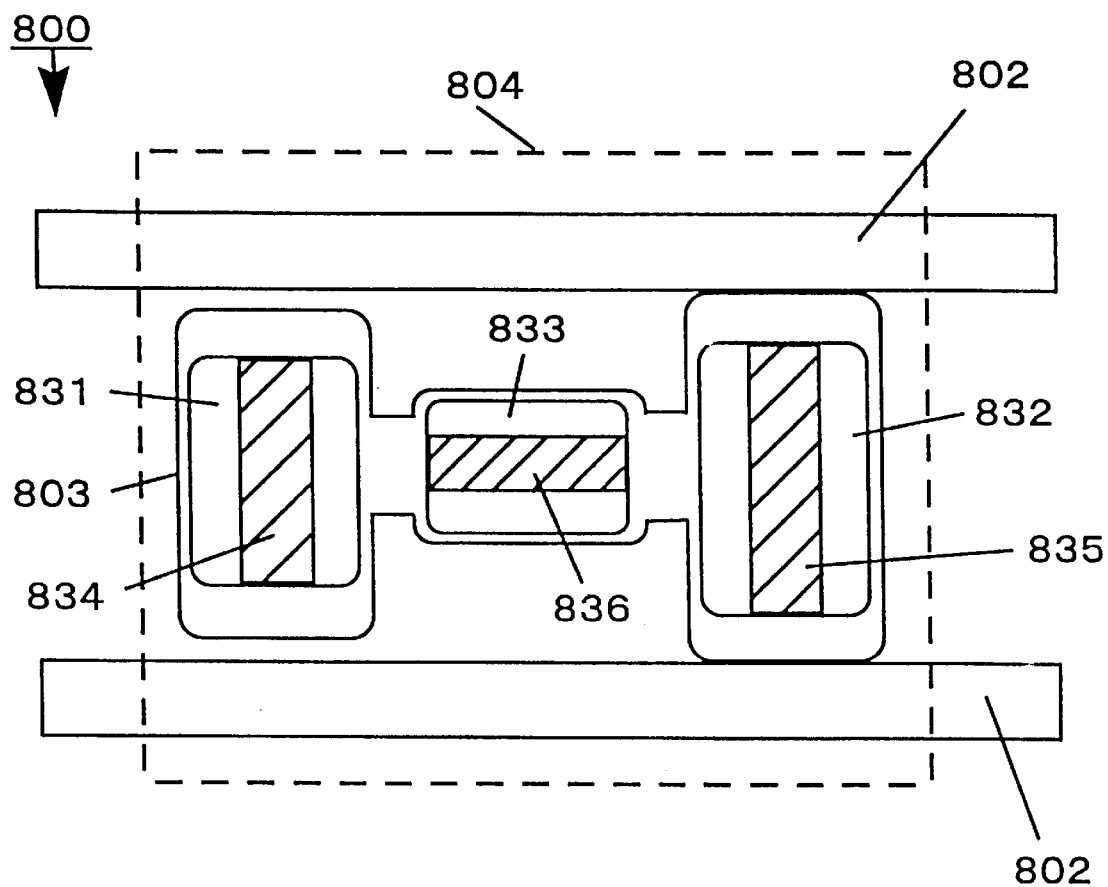
FIG. 18 is a top view showing a conventional type actuator based on an inch-worm system.

FIG. 16 is a block diagram showing a driving unit 1500 for the compact lathe 1000. This driving unit 1500 mainly comprises a personal computer 1501 for providing NC controls and PC controls over the compact lathe 1000, a piezoelectric element driving section 1502, and a DC current supply section 1503. The method of driving the actuators 100a and 100b is the same as that in Embodiment 1. Namely, signal from the personal computer 1501 is amplified by the piezoelectric element driving section 1502 to drive the actuators 100a, 100b. The personal computer 1501 provides positional controls according to a feedback signal from the linear scale provided on the Z-X axis.

The DC current supply section 1503 supplies power to the micro-motor 1200. The personal computer 1501 supplies or disconnects power. It should be noted that a power source used or this purpose may be 4 pieces of single 3-V cell.

Measurement was made for the compact-lathe 1000 having the configuration as described above, and the size was 32 mm (length)×25 mm (depth)×30.5 mm (height) . The weight was around 100 g. As compared to a general multi-purposed lathe, the dimension is around 1/50, and the weight is around 1/5000 to 1/10000, and substantial reduction in weight as well as in size was realized.

Also the specific arrangement of the spindle 1100 was also effective in size reduction. FIG. 17A is an explanatory view showing general arrangement of components (spindle unit 1100, a Z-X axis actuator 100, and a blade base 1400) of the compact lathe 1000. FIG. 17B is an explanatory view showing general arrangement of a lathe based on a system in which a blade base is moved. In this compact lathe 1000, the spindle 1100 is mounted on the Z-X axis actuator 100, so that, in a case where each of the components has an identical size, the floor area can substantially be reduced as compared to the case shown in FIG. 17B.

Then, a brass material with an outer diameter of 2 mm was attached to this compact-lathe 1000, and a cutting operation was executed under the conditions of a rotational speed of spindle of around 10000 rpm, a feed speed of around 10 $\mu$m/sec, and a cutting rate of around 30 $\mu$m. Then measurement was made for roughness of a cut surface, and it was found that the maximum surface roughness was around 1.5 $\mu$m. After machining, any large swell was not recognized in a range of around 1.8 mm. Also measurement was made for circularity of the cut portion, and it was found that the circularity was around 2.5 $\mu$m. These numerical values indicate that this compact lathe has a machining precision equivalent to that of a general multiple-purposed lathe.

Also cutting was repeated under the same machining conditions, and a needle with a diameter of 60 $\mu$m could be machined. The power consumption was around 1.6 W even for the cutting rate of 200 $\mu$m. In contrast, the rated power consumption of a motor generally used for a multiple purpose lathe is in a range from 735 W to 1470 W. For the reasons as described above, it is understood that power consumption of this compact lathe 1000 according to the present invention is in a range from around 1/500 to 1/1000 of that in the general multiple-purposed lathe.

It should be noted that, although the actuator 100 according to Embodiment 1 was used in Embodiment 4, this embodiment was not limited to this configuration. For instance, the rotating actuator 300 described in Embodiment 3 may be used to form a dividing table. Also this compact lathe according to the present invention may be used not only in industrial machines such as a machining center or a robot, but also in electric housewares.

As described above, the actuator according to the present invention comprises a first displacing unit which can fix or change a position thereof against a guide by displacing; a second displacing unit which is connected to said first displacing unit and displaces in at least a direction different from that in which said first displacing unit displaces; and a holder which maintains said second displacing unit on said guide with a force weaker than a force of said first displacing unit for fixing and moves according to the displacement of said second displacing unit, so that the holder can be moved by displacing the second displacing unit in the state where the first displacing unit is fixed. After the holder have been moved, the first displacing unit may be returned to the original position, and then the second displacing unit to the original position. For this reason, movement by two displacing unit is possible. Also the actuator can easily be constructed, so that it is advantageous in size reduction, and the driving method is also easy. Also only two displacing unit are required, so that a quantity of energy required for displacement is small.

The actuator according to the present invention comprises a guide in which two guide rails are provided at a certain space from each other; a first displacing unit provided between the guide rails of this linear guide and fixed between said guide rails by displacing; a second displacing unit which displaces in a direction crossing perpendicular to the displacing direction of this first displacing unit; and a holder which connects said first displacing unit to said second displacing unit, holds said second displacing unit between said guide rails with a force weaker than a force of said first displacing unit for fixing and moves according to the displacement of said second displacing unit, so that the holder can be moved by displacing the second displacing unit in the state where the first displacing unit is fixed. After the holder have been moved, the first displacing unit may be returned to the original position, and then the second displacing unit to the original position. For this reason, movement by two displacing unit is possible. Also the actuator can easily be constructed, so that it is advantageous in size reduction, and the driving method is also easy. Also only two displacing unit are required, so that a quantity of energy required for displacement is small.

In the actuator according the present invention, a holding force of said holder is adjusted by adjusting a space between the guide rails of said linear guide. This holding force give effects to movement, so that the moving characteristics of the actuator can freely be adjusted.

In the actuator according to the present invention, an elastic body is provided on at least one of the guide rails to give a pressing force to the guide rail. With the configuration, a holding force of the holder can easily be adjusted.

In the actuator according to the present invention, a displacing unit is provided on at least one of the guide rails to give a pressing force to said guide rail by displacement of this displacing unit. As the displacing unit can displace instantaneously, a holding force of the holder can be changed instantaneously.

The actuator according to the present invention comprises a cyclical displacement instructing unit for giving a cyclic displacement instruction to said first displacing unit and also giving a cyclic displacement instruction having a phase difference from the cyclic displacement instruction given to said first displacing unit to said second displacing unit; and a movement rate resolution changing unit for changing a resolution for a movement rate by changing said phase difference, so that minute displacement control can be provided with an arbitrary resolution.

The actuator according to the present invention comprises a cyclic displacement instructing unit for giving a cyclic displacement instruction to said first displacing unit and also giving a cyclic displacement instruction having a phase different from the cyclic displacement instruction given to said first displacing unit to said second displacing unit; and a moving speed changing unit for changing a moving speed by changing said cycle, so that an arbitrary moving speed can easily be obtained.

The method of driving an actuator according to the present invention comprises a step of fixing a position thereof against said guide rails by displacing said first displacing unit; a step of displacing said second displacing unit and also moving said holder in association with displacement of said second displacing unit; a step of returning said first displacing unit to the original position; and a step of returning said second displacing unit to the original position and moving said first displacing unit in association with the returning movement of said second displacing unit. With the configuration, movement by two displacing unit is possible. Also the driving method is quite easy.

The method of driving an actuator according to the present invention comprises a step of displacing said second displacing unit and also moving said first displacing unit in association with the displacement; a step of fixing a position thereof against said guide rails by displacing said first displacing unit; a step of returning said second displacing unit to the original position and also moving said holder in association with the returning movement of said second displacing unit; and a step of returning said first displacing unit to the original position. With the configuration, movement by two displacing unit is possible. Also the driving method is quite easy.

The method of driving an actuator according to the present invention comprises a step of giving a cyclic displacement instruction to said first displacing unit; and a step of giving a cyclic displacement instruction having a phase difference from the cyclic displacement instruction given to said first displacing unit to said second displacing unit. With the configuration, movement by two displacing unit is possible. Also the driving method is quite easy.

The method of driving an actuator according to the present invention comprises a step of changing a resolution for a movement rate by changing said phase difference. With this configuration, a minute displacement control can be executed with an arbitrary resolution.

The method of driving an actuator according to the present invention comprises a step of changing a moving speed by changing said cycle. With this step, an arbitrary moving speed can easily be obtained.

The computer-readable recording medium according to the present invention records therein a program making a computer execute an actuator driving method as described above. When an actuator is driven with the program as described above, movement by two displacing unit is possible. Further the driving method is easy. Additionally minute displacement control can be provided with an arbitrary resolution, and an arbitrary moving speed can easily be obtained.

The compact machine tool according to the present invention uses the actuator as described above as a moving unit, so that size of the entire machine tool can be reduced.

The compact machine tool according to the present invention uses an actuator as described above as a moving unit to move at least the spindle side with said moving unit, and the blade side is fixed. With this configuration, the floor area can be made smaller as compared to that of a machine tool in which the blade side is moved.

This application is based on Japanese patent application Nos. HEI 8-267543 and HEI 9-161717 filed in the Japanese Patent Office on Oct. 8, 1996 and Jun. 18, 1997 respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An actuator comprising:
   a base;
   a guide assembly mounted on the base;
   a first displacing unit mounted on the base for displacement into engagement with the guide assembly to place the first displacing unit in a fixed state and for displacement in a moving direction along the guide assembly when the first displacing unit is not in a fixed state;
   a second displacing unit integrally connected to the first displacing unit and mounted on the base for displacement in the moving direction along the guide assembly; and
   a holder mounted in contact with the guide assembly for movement with the second displacing unit and for supporting the second displacing unit on the guide assembly with a frictional force weaker than a force with which the first displacing unit is maintained in the fixed state to thereby allow the second displacing unit and the holder to move in the moving direction while the holder contacts the guide assembly and while the first displacing unit is in the fixed state.

2. An actuator according to claim 1; further comprising: a cyclic displacement instructing unit for supplying a cyclic displacement instruction having a first preselected phase to the first displacing unit to cyclically displace the first displacing unit, and for supplying a cyclic displacement instruction having a second preselected phase different from the first preselected phase to the second displacing unit to cyclically displace the second displacing unit; and a movement rate changing unit for changing a rate of movement of the first and second displacing units by varying the difference between the first and second preselected phases.

3. An actuator according to claim 1; further comprising: a cyclic displacement instructing unit for supplying a cyclic displacement instruction having a first preselected phase to the first displacing unit to cyclically displace the first displacing unit, and for supplying a cyclic displacement instruction having a second preselected phase different from the first preselected phase to the second displacing unit to cyclically displace the second displacing unit; and a moving speed changing unit for changing a moving speed of the first and second displacing units by varying the cyclic displacement instructions.

4. An actuator according to claim 1; wherein the first and second displacing units are made of a single piece of flexible material, whereby when the first displacing unit is released from the fixed state after the second displacing unit is displaced in the moving direction while the first displacing unit is in the fixed state, the first displacing unit moves in the moving direction toward the second displacing unit due to the flexibility of the single piece of flexible material.

5. An actuator according to claim 1; wherein the first and second displacing units are made of a single piece of elastically stretchable material.

6. An actuator according to claim 1; further comprising means for displacing the second displacing unit in the moving direction, while the first displacing unit is in the fixed state, with a force weaker than the force with which the first displacing unit is maintained in the fixed state and greater than the frictional force with which the holder supports the second displacing unit in contact with the guide assembly.

7. An actuator according to claim 1; wherein the first displacing unit comprises a first piezoelectric element and a first flexible support member having a supporting section for supporting the first piezoelectric element; and wherein the second displacing unit comprises a second piezoelectric element, a second flexible support member having a supporting section for supporting the second piezoelectric element, and peripheral surface portions defining the holder for supporting the second displacing unit in contact with the guide assembly.

8. An actuator according to claim 7; wherein the first and second flexible support members are made of a single piece of elastically stretchable material.

9. An actuator according to claim 7; wherein the first piezoelectric element is disposed in the supporting section of the first flexible support member along a direction generally perpendicular to the moving direction; and wherein the second piezoelectric element is disposed in the supporting section of the second flexible support member along a direction generally parallel to the moving direction.

10. An actuator according to claim 1; wherein the guide assembly comprises a pair of spaced-apart guide rails; and wherein the first and second displacing units are disposed between the guide rails.

11. An actuator according to claim 10; wherein the guide rails are generally circular in cross section and are disposed in concentric relation to one another such that during displacement of the second displacing unit, the second displacing unit is guided by the guide rails for circular movement in the moving direction.

12. An actuator according to claim 10; wherein the guide rails are generally parallel to each other such that during displacement of the second displacing unit, the second displacing unit is guided by the guide rails for linear movement in the moving direction.

13. An actuator according to claim 12; wherein the first displacing unit is mounted on the base for displacement into and out of engagement with each of the guide rails; and wherein a direction of movement of the first displacing unit during displacement into engagement with the guide rails is generally perpendicular to the moving direction of the second displacing unit.

14. An actuator according to claim 12; further comprising a cyclic displacement instructing unit for supplying a cyclic displacement instruction having a first preselected phase to the first displacing unit to cyclically displace the first displacing unit, and for supplying a cyclic displacement instruction having a second preselected phase different from the first preselected phase to the second displacing unit to cyclically displace the second displacing unit; and a movement rate changing unit for changing a rate of movement of the first and second displacing units by varying the difference between the first and second preselected phases.

15. An actuator according to claim 12; further comprising a cyclic displacement instructing unit for supplying a cyclic displacement instruction having a first preselected phase to the first displacing unit to cyclically displace the first displacing unit, and for supplying a cyclic displacement instruction having a second preselected phase different from the first preselected phase to the second displacing unit to cyclically displace the second displacing unit; and a moving speed changing unit for changing a moving speed of the first and second displacing units by varying the cyclic displacement instructions.

16. An actuator according to claim 12; further comprising adjusting means for adjusting the frictional force with which the holder supports the second displacing unit on the guide rails by adjusting a space between the guide rails.

17. An actuator according to claim 16; wherein the adjusting means comprises a piezoelectric element for generating a pressing force to press one of the guide rails into pressure contact with the second displacing unit by displacement of the piezoelectric element upon application of a voltage thereto.

18. An actuator according to claim 16; wherein the adjusting means includes biasing means for biasing one of the guide rails into pressure contact with the second displacing unit.

19. An actuator according to claim 17; wherein the adjusting means includes an adjusting screw for adjusting a pressing force of the biasing means.

20. A method of driving an actuator comprising the steps of:
providing an actuator having a guide assembly, a first displacing unit mounted for displacement into engagement with the guide assembly and for displacement in a moving direction along the guide assembly, a second displacing unit integrally connected to the first displacing unit and mounted for displacement in the moving direction, and a holder mounted in contact with the guide assembly for movement with the second displacing unit and for supporting the second displacing unit on the guide assembly;
displacing the first displacing unit to bring the first displacing unit into engagement with the guide assembly with a first frictional force to thereby place the first displacing unit in a fixed state;
displacing the second displacing unit in the moving direction while the holder contacts the guide assembly with a second frictional force weaker than the first frictional force and while the first displacing unit is in the fixed state;
displacing the first displacing unit to bring the first displacing unit out of engagement with the guide assembly to thereby release the first displacing unit from the fixed state; and
terminating displacement of the second displacing unit in the moving direction to thereby move the first displacing unit in the moving direction.

21. A computer-readable recording medium for storing a program for processing by a computer to execute the method of driving the actuator according to claim 20.

22. A method of driving an actuator comprising the steps of:
providing an actuator having a guide assembly, a first displacing unit mounted for displacement into engagement with the guide assembly and for displacement in a moving direction along the guide assembly, a second displacing unit integrally connected to the first displacing unit and mounted for displacement in the moving direction, and a holder mounted in contact with the guide assembly for movement with the second displacing unit for supporting the second displacing unit on the guide assembly;
displacing the second displacing unit in the moving direction while the holder contacts the guide assembly to thereby move the first displacing unit in the moving direction in association with the displacement of the second displacing unit;
displacing the first displacing unit to bring the first displacing unit into engagement with the guide assembly with a first frictional force to thereby place the first displacing unit in a fixed state;
terminating displacement of the second displacing unit in the moving direction; and
displacing the first displacing unit to bring the first displacing unit out of engagement with the guide assembly to thereby release the first displacing unit from the fixed state.

23. A computer-readable recording medium for storing a program for processing by a computer to execute the method of driving the actuator according to claim 22.

24. A method of driving an actuator comprising the steps of:
providing an actuator having a guide assembly a first displacing unit mounted for displacement into engagement with the guide assembly to place the first displacing unit in a fixed state and for displacement in a moving direction along the guide assembly when the first displacing unit is not in a fixed state, a second displacing unit integrally connected to the first displacing unit and mounted for displacement in the moving direction, and a holder mounted on the guide assembly for movement with the second displacing unit and for supporting the second displacing unit on the guide assembly in a static frictional state and a moving frictional state with a frictional force weaker than a force with which the first displacing unit is maintained in the fixed state, whereby in the moving frictional state the second displacing unit moves in the moving direction while the holder contacts the guide assembly;
supplying a cyclic displacement instruction having a first preselected phase to the first displacing unit to cyclically displace the first displacing unit between the fixed state and a state in which the first displacing unit is displaced in the moving direction; and
supplying a cyclic displacement instruction having a second preselected phase different from the first preselected phase to the second displacing unit to cyclically displace the second displacing unit from a static frictional state to a moving frictional state.

25. A method of driving an actuator according to claim 24; further comprising the step of changing a rate of movement of the first and second displacing units by varying the difference between the first and second preselected phases.

26. A method of driving an actuator according to claim 24; further comprising the step of changing a moving speed of the first and second displacing units by varying the cyclic displacement instructions.

27. A computer-readable recording medium for storing a program for processing by a computer to execute the method of driving the actuator according to claim 24.

28. In a compact machine tool having a moving unit for moving a workpiece or for moving a tool for working the workpiece, the improvement comprising: an actuator having a guide assembly mounted on the base, a first displacing unit mounted on the base for displacement into engagement with the guide assembly to place the first displacing unit in a fixed state and for displacement in a moving direction along the guide assembly when the first displacing unit is not in a fixed state, and a second displacing unit integrally connected to the first displacing unit and mounted on the base for displacement in the moving direction along the guide assembly, the moving unit being mounted in contact with the guide assembly for movement with the second displacing unit and for supporting the second displacing unit on the guide assembly with a frictional force weaker than a force with which the first displacing unit is maintained in the fixed state to thereby allow the second displacing unit and the moving unit to move in the moving direction while the moving unit contacts the guide assembly and while the first displacing unit is in the fixed state.

29. In a compact machine tool having a base, a spindle mounted on the base for rotating a workpiece, a tool fixed on the base for working the workpiece, and a moving unit for moving the spindle, the improvement comprising an actuator having a guide assembly mounted on the base, a first displacing unit mounted on the base for displacement into engagement with the guide assembly to place the first displacing unit in a fixed state and for displacement in a moving direction along the guide assembly when the first displacing unit is not in a fixed state, and a second displacing unit integrally connected to the first displacing unit and mounted on the base for displacement in the moving direction along the guide assembly, the moving unit being mounted in contact with the guide assembly for movement with the second displacing unit and for supporting the second displacing unit on the guide assembly with a frictional force weaker than a force with which the first displacing unit is maintained in the fixed state to thereby allow the second displacing unit, the moving unit and the spindle to move in the moving direction while the moving unit contacts the guide assembly and while the first displacing unit is in the fixed state.

30. A compact machine tool according to claim 29; wherein the tool comprises a cutting blade for cutting the workpiece.

* * * * *